(12) United States Patent
Eil

(10) Patent No.: US 11,873,164 B2
(45) Date of Patent: Jan. 16, 2024

(54) AUTOMATED WAREHOUSE SYSTEMS, ASSEMBLIES, APPARATUSES, AND METHODS FOR ASSEMBLING MIXED PALLETS AND FACILITATING ORDER PICKING

(71) Applicant: NewTeq Holding B.V., Breda (NL)

(72) Inventor: Hans Eil, Soest (NL)

(73) Assignee: NEWTEQ HOLDING B.V., Breda (NL)

( * ) Notice: Subject to any disclaimer, the term of this patent is extended or adjusted under 35 U.S.C. 154(b) by 0 days.

(21) Appl. No.: 18/184,989

(22) Filed: Mar. 16, 2023

(65) Prior Publication Data

US 2023/0219760 A1 Jul. 13, 2023

Related U.S. Application Data

(63) Continuation of application No. 17/863,104, filed on Jul. 12, 2022, now Pat. No. 11,629,009.

(60) Provisional application No. 63/221,770, filed on Jul. 14, 2021.

(51) Int. Cl.
| | |
|---|---|
| B65G 1/137 | (2006.01) |
| B65G 47/91 | (2006.01) |
| B65G 57/24 | (2006.01) |
| G06Q 10/087 | (2023.01) |
| B65G 1/04 | (2006.01) |

(52) U.S. Cl.
CPC ......... *B65G 1/1373* (2013.01); *B65G 1/0492* (2013.01); *B65G 1/1376* (2013.01); *B65G 47/911* (2013.01); *B65G 57/24* (2013.01); *G06Q 10/087* (2013.01); *B65G 2207/46* (2013.01); *B65G 2812/019* (2013.01)

(58) Field of Classification Search
None
See application file for complete search history.

(56) References Cited

U.S. PATENT DOCUMENTS

| | | | | |
|---|---|---|---|---|
| 8,348,591 B2 * | 1/2013 | Perl | ...................... | B65G 57/005 |
| | | | | 414/789.5 |
| 8,622,685 B2 * | 1/2014 | Van Schijndel | ....... | B65G 47/90 |
| | | | | 414/789.9 |
| 11,186,445 B2 * | 11/2021 | Otsuru | ................. | B25J 15/0052 |
| 11,414,279 B2 * | 8/2022 | Hayes | .................... | B65G 59/04 |
| 2008/0193272 A1 * | 8/2008 | Beller | .................... | B65G 59/04 |
| | | | | 414/797 |

* cited by examiner

*Primary Examiner* — Kavel Singh
(74) *Attorney, Agent, or Firm* — Bryan Cave Leighton Paisner LLP

(57) ABSTRACT

This disclosure is directed to automated warehouse facilities that are configured to assemble mixed pallets. The warehouse facilities can include one or more layer handling devices that are configured to remove layers from pallets in a delayering operational mode, and to add layers to pallets in a palletizing operation mode. The warehouse facilities also may include one or more item retrieval devices that are configured to retrieve individual items from storage racks. The warehouse facilities can include other automated devices as well.

22 Claims, 22 Drawing Sheets

US 11,873,164 B2

AUTOMATED WAREHOUSE SYSTEMS, ASSEMBLIES, APPARATUSES, AND METHODS FOR ASSEMBLING MIXED PALLETS AND FACILITATING ORDER PICKING

CROSS-REFERENCE TO RELATED APPLICATIONS

This application is a continuation of U.S. patent application Ser. No. 17/863,104 filed on Jul. 12, 2022, which claims benefit of, and priority to, U.S. Provisional Application No. 63/221,770 filed on Jul. 14, 2021. The contents of the aforementioned applications are herein incorporated by reference in their entireties.

TECHNICAL FIELD

The present disclosure is directed to improved systems, assemblies, apparatuses, and methods for performing custom order picking in automated warehouses.

BACKGROUND

Various types of warehouses are used to store items (e.g., goods) before the items are distributed for export or delivery to customers. For example, a warehouse may initially receive a shipment of pallets, each of which includes a plurality of identical or homogenous items stacked in layers on the pallet. The warehouse may store the pallets in a storage area, and the pallets may be retrieved from the storage area when orders are received at the warehouse.

In many cases, the warehouse may receive orders that necessitate assembly of heterogeneous or mixed pallets, each of which comprises at least two different types of items. For example, in some cases, a mixed pallet may comprise one or more layers of a first item type and one or more layers of a second item type. Likewise, a mixed pallet may comprise at least one layer that includes two different item types (e.g., a layer that includes a single item of a first type and a remainder of items of a second type).

Many traditional techniques for assembling mixed pallets involve manual assembly of the pallets by human operators. For example, assembly of a mixed pallet may involve a human operator manually removing a layer of items from a homogenous pallet and manually placing a new layer of items on top of the pallet, thereby creating a mixed pallet with at least two different types of items. This manual technique for assembling mixed pallets is inefficient, time-consuming, and often exposes human operators to dangers in the warehouse environment.

To a more limited extent, some semi-automated or automated techniques may be utilized for assembling mixed pallets also. In some scenarios, these techniques may involve use of automated guided vehicles (AGVs) to transport and place pallets in an area designated for assembly of mixed pallets. This technique for assembling mixed pallets requires large areas of floor space to be dedicated for storing the pallets, as well as pathways that allow the AGVs to navigate about the warehouse. Additionally, the process can be relatively time-consuming and inefficient because each AGV is typically only capable of carrying a single pallet. The AGVs are required to constantly replenish the pallets in the designated area, and to constantly transport assembled pallets to other areas of the warehouse.

BRIEF DESCRIPTION OF DRAWINGS

The principles are illustrated in the figures of the accompanying drawings, which are meant to be exemplary and not limiting, and in which.

Figure 1A:
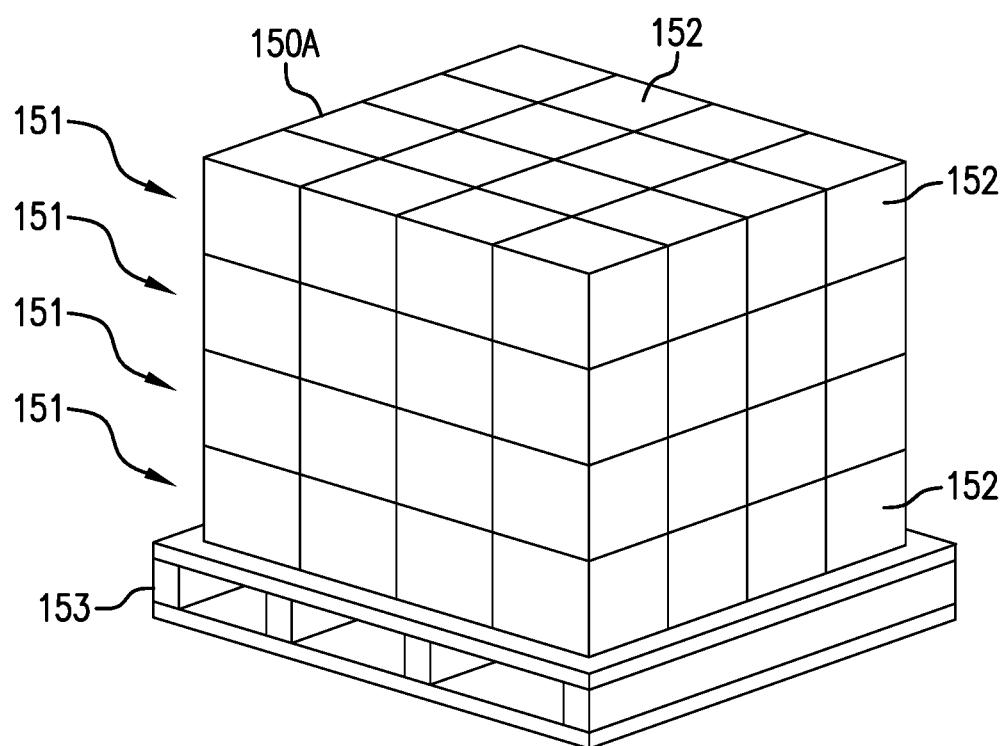
FIG. 1A is an illustration of an exemplary pallet according to certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

DETAILED DESCRIPTION OF EXEMPLARY EMBODIMENTS

The present disclosure relates to improved systems, assemblies, apparatuses, methods, and techniques for performing order picking in automated warehouse facilities. Certain embodiments are directed to improved warehouse facilities and techniques that enable assembly of mixed pallets in an automated fashion. These automated warehouse facilities and techniques overcome the aforementioned problems, as well as other problems related to assembling mixed pallets.

In certain embodiments, automated warehouse facilities are equipped with automated conveyor systems that are able to route pallets, layers, and/or items to different sections of the automated warehouse facilities. To facilitate assembly of mixed pallets, inbound homogenous pallets received at an inbound processing section may initially be routed by the automated conveyor systems to one or more layer handling devices located in an order picking section. Each of the layer handling devices can be configured to operate in both a delayering operational mode and a palletizing operational mode. In the delayering operational mode, the one or more layer handling devices can be configured to separate the pallets into layers, and place the layers on trays for storage on one or more rack structures included in an order picking storage section.

During fulfillment, one or more ASRSs can be configured to grab the trays with the layers from the storage racks, and place the trays with the layers on an automated conveyor system for transport to one or more layer handling devices that are configured in a palletizing operational mode. In the palletizing operational mode, the layer handling devices can be configured to assemble mixed pallets by selectively adding layers to pallets that are being assembled. Once assembled, the mixed pallets can be transported by the automated conveyor system to an output processing section and loaded onto one or more delivery vehicles. In this manner, the automated warehouse facilities can assemble mixed pallets that include two or more heterogeneous layers.

The automated warehouse facilities also can be utilized to facilitate assembly of mixed pallets that include mixed layers, each of which includes two or more heterogeneous items, and/or to add individual items to pallets. In certain embodiments, after the layers of the pallets are separated and stored in the order picking storage section, one or more item retrieval devices can be configured to grab individual items (or multiple items) from layers stored in the storage racks. The retrieved items can then be routed by the automated conveyor system to one or more assembly workstations, where the items can be added to a pallet that is being assembled and/or utilized to create one or more mixed layers for the pallet being assembled.

The configurations of the layer handling devices can vary. In certain embodiments, the layer handling devices may utilize a combination of vacuum systems, air pump systems, and/or clamping systems to grab and manipulate layers of pallets (e.g., when performing delayering and/or palletizing functions). Additionally, the layer handling devices can execute a centering detection mechanism that enables the layer handling devices to accommodate pallets with having non-centered layers. Furthermore, the layer handling devices can be equipped with tray shift systems that enable layers to be placed on trays during delayering operations. These and other exemplary features of the layer handling devices are described in further detail below.

The configurations of the item retrieval devices also can vary. In certain embodiments, each item retrieval device can include a first handling portion that is configured to pull trays out from storage racks, and a second handling portion that is configured to grab one or one or more items from the trays. The item retrieval devices also can be equipped with advanced sensing systems that enable the item retrieval devices to precisely retrieve the items from the layers. These and other exemplary features of the item retrieval devices are described in further detail below.

The techniques described herein can be incorporated into, or applied to, any type of warehouse facility. While certain portions of this disclosure may describe embodiments involving cold storage warehouses, it should be recognized that that the systems, assemblies, devices, and methods described throughout this disclosure can be applied to other types of warehouses, structures, and/or buildings.

The improved design of the warehouse layouts, apparatuses, assemblies, and methods can significantly increase the efficiency of the warehouses in various ways. For example, the techniques and technologies described herein can enable mixed pallets to be assembled in an automated fashion. Additionally, the techniques and technologies described herein can enable automated storage of pallets, layers, and/or items in an automated fashion. The automated systems described herein can significantly increase the speed and efficiency of warehouse operations, and can avoid exposing individuals to dangerous conditions (e.g., dangerous machinery and/or climate controlled areas).

It should be noted that any feature described for one embodiment can be incorporated into, or combined with, any other embodiment described herein. Moreover, one of ordinary skill in the art would recognize that the systems, configurations, and/or structures of the warehouse facilities and apparatuses can vary, and that the components of the warehouse facilities and apparatuses can be configured in other arrangements. It also should be recognized that none of the features described herein are to be considered essential and can be omitted in various embodiments.

Figure 1B:
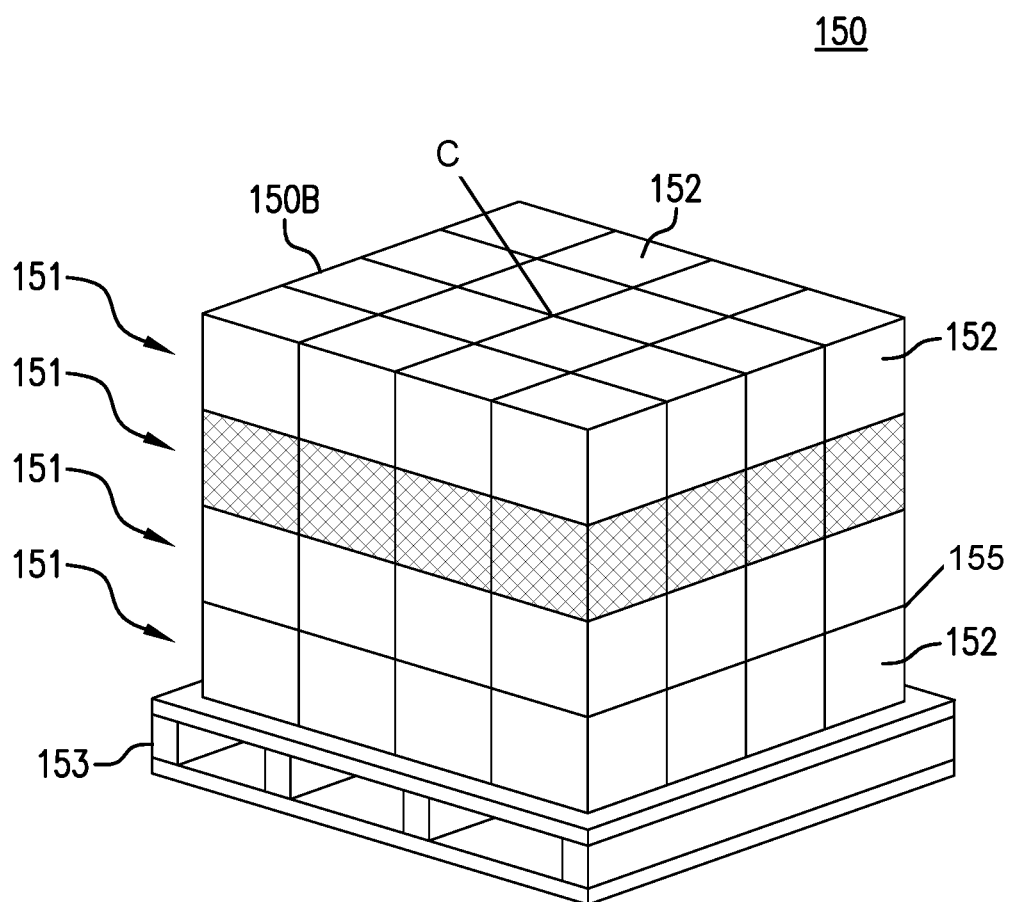
FIG. 1B is an illustration of an exemplary mixed pallet according to certain embodiments.
Figure 1C:
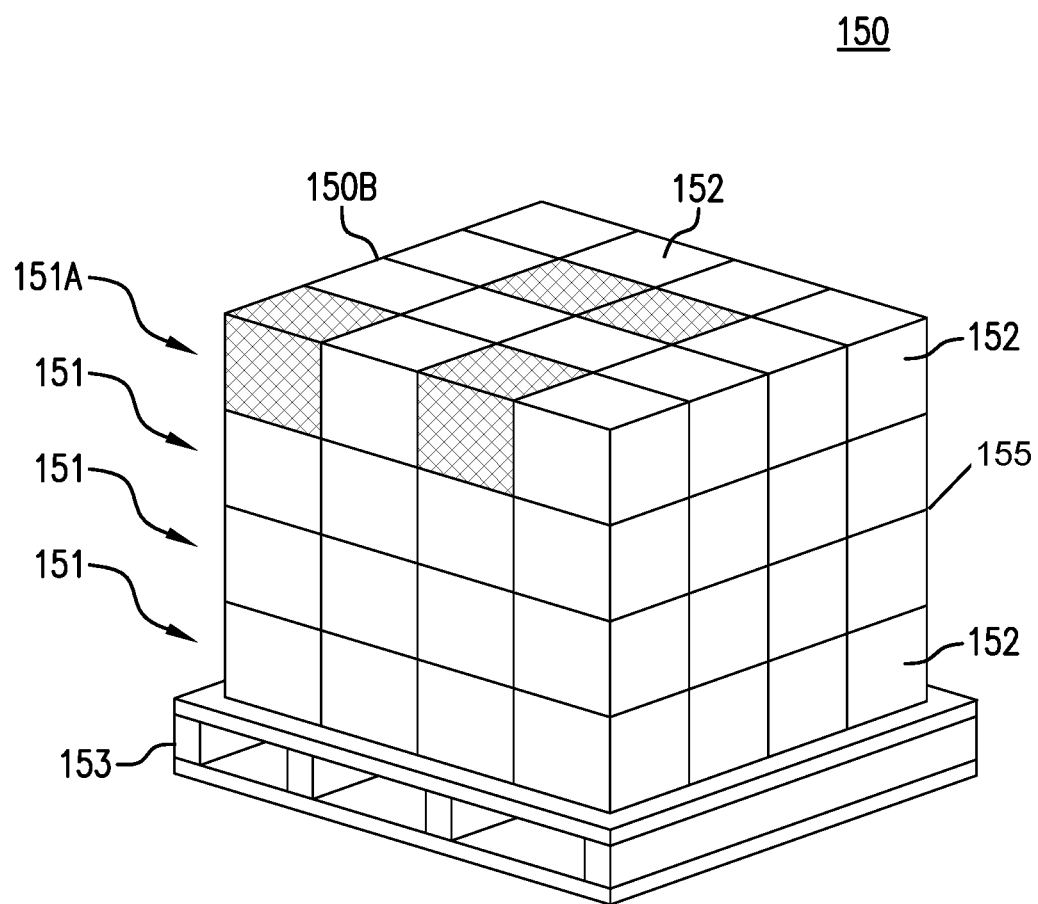
FIG. 1C is an illustration of another exemplary mixed pallet according to certain embodiments.

FIGS. 1A-1C illustrate exemplary pallets 150 according to certain embodiments. Each pallet 150 comprises multiple layers 151 stacked on top of one another. Each layer 151 includes multiple items 152. The items 152 can generally correspond to boxes, products, goods, or the like. The layers 151 generally correspond to rows of items 152 or groupings of items 152.

In this example, the pallets 150 are configured in a 4×4×4 configuration that includes four layers 151 and each layer 151 includes sixteen items 152. However, it should be understood that a pallet can generally include any number of layers 151 and/or each layer 151 may generally include any number of items 152. In certain embodiments, the pallets 150 may include at least two layers 151 and each layer 151 may include at least two items 152. However, the size and configuration of the pallets 150 (as well as the number of layers 151 and items 152 included in the pallets 150) can vary based on the size of the items 152 and/or other factors.

A homogenous pallet 150A (FIG. 1A) may represent a pallet 150 in which all of the items 152 are of a single type (e.g., the same type of goods or boxes). A mixed pallet 150B (FIGS. 1B and 1C) may represent a pallet 150 that includes at least two different types of items 152 and/or two different types of layers 151. In FIG. 1B, a mixed pallet 150B is illustrated that includes a layer 151 of items 152 that is different from the other layers 151 of items 152. In FIG. 1C, a mixed pallet 150B includes a mixed layer 151A (located at the top of the pallet) that includes two or more different types of items 152. In this example, the other layers in the mixed pallet 150B may represent homogenous layers, each of which includes a single type of items 152.

The layers 151 and items 152 associated with the pallets 150 are supported on a pallet platform structure 153. The layers 151 and items 152 are situated on a flat upper surface of the pallet platform structure 153. A flat lower surface enables the pallet to rest on an underlying surface (e.g., a floor surface or storage rack). A spacing is located between the upper surface and the lower surface of the pallet platform structure 153. In some scenarios, the spacing enables a transport vehicle (e.g., a forklift and/or automated guided vehicle) to lift and transport the pallets 150. Additionally, as explained below, a slip sheet 155 may be inserted or included between each layer 151 of a pallet 150 when the pallet 150 is assembled.

Figure 2A:
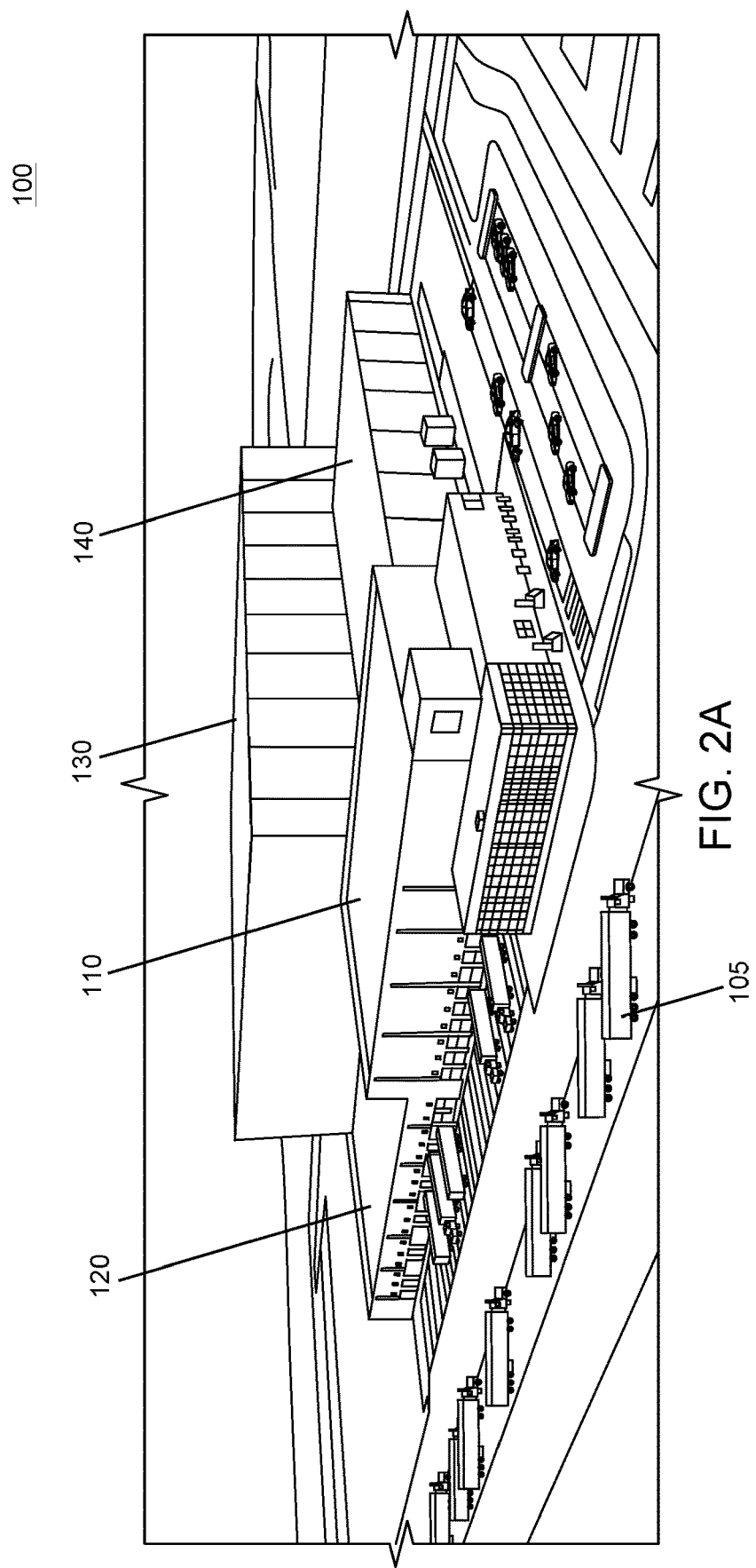
FIG. 2A is an external view of an exemplary warehouse facility according to certain embodiments.

FIG. 2A discloses an external view of an exemplary warehouse facility 100 according to certain embodiments. Generally speaking, the warehouse facility 100 may represent any type of structure that provides services related to storage, fulfillment, and/or distribution of pallets 150, layers 151, and/or items 152. In certain embodiments, the warehouse facility 100 may represent a cold storage warehouse that stores and fulfills orders for perishable items 152 (e.g., food, produce, flowers, and/or other types of perishable items) in a climate-controlled environment within the facility. Additionally, or alternatively, the warehouse facility 100 may represent a warehouse that stores and fulfills orders for non-perishable items 152 (e.g., products, electronics, furniture, etc.) that do not require a climate-controlled environment.

In certain embodiments, the warehouse facility 100 may represent an automated warehouse facility that utilizes various machinery, robotics, and/or computerized devices to automate one or more warehousing functions. For example, an automated warehouse can be configured to automate functions associated with processing inbound pallets received at the facility, transporting inbound pallets to a storage area, placing the inbound pallets on storage racks, retrieving pallets from storage racks, processing outbound pallets for fulfillment, storing and assembling mixed pallets for fulfillment, and/or other warehousing functions described herein. As described in further detail below, the machinery, robotics, and/or computerized devices utilized at the warehouse facility 100 to perform these or other automated warehousing functions can include, inter alia, automated conveyor systems, automated storage and retrieval systems (ASRSs), layer handling devices, item retrieval devices, and/or warehousing management devices and software.

The warehouse facility 100 can include an inbound processing section 110, an outbound processing section 120, a storage section 130, and an order picking section 140. The inbound processing section 110 can generally represent an area of the warehouse facility 100 that is designated to receive inbound pallets 150 (e.g., from one or more delivery vehicles 105). The outbound processing section 120 can generally represent an area of the warehouse facility 100 that is designated to process outbound pallets 150 for delivery or fulfillment. The storage section 130 can generally represent an area of the warehouse facility 100 that stores pallets 150 prior to fulfillment. In some embodiments, the storage section 130 may represent a refrigerated or cooled storage area that is capable of storing perishable items. The order picking section 140 can generally represent an area of the warehouse facility 100 that performs functions related to assembling mixed pallets 150B.

In one exemplary scenario, one or more delivery vehicles 105 (e.g., trucks, cargo vans, airplanes, railcars, boats, ships, sea containers, etc.) may initially deliver pallets 150 to the warehouse facility 100. The pallets 150 received at the warehouse facility 100 may be unloaded from the delivery vehicles 105 at or near the inbound processing section 110. The pallets 150 may be placed on an automated conveyor system that is configured to transport a first portion of pallets 150 to the storage section 130, and a second portion of the pallets 150 to the order picking section 140.

With regard to the first portion of pallets 150, one or more ASRSs (e.g., ASRSs 260 in FIG. 2B) located in the storage section 130 can retrieve the first portion of pallets from the automated conveyor system and place the pallets 150 on rack structures included in the storage section 130. In response to receiving an order for fulfillment, the one or more ASRSs may then retrieve one or more pallets 150 from the rack structures included in the storage section 130 and place the pallets on the automated conveyor system. The automated conveyor system may then transport the pallets 150 to the outbound processing section 120, where the pallets 150 can be loaded onto delivery vehicles 105.

With regard to the second portion of pallets 150, the automated conveyor system can transport the pallets 150 to the order picking section 140 of the warehouse facility 100. In certain embodiments, the order picking section 140 can include one or more layer handling devices (e.g., such as the exemplary layer handling devices 410 illustrated in FIGS. 4A-4I). Each of the layer handling devices can be configured to operate in a delayering operational mode to remove layers 151 from the pallets 150, and place the layers 151 on trays. The trays can then be placed on an automated conveyor system for transport to a separate order picking storage area included within the order picking section 140. One or more ASRSs included in the order picking storage area can be configured to retrieve the trays with the layers 151 from the automated conveyor system and place the trays with the layers 151 on rack structures for storage. The trays and layers 151, or individual items 152 included in the layers 151, that are stored in the order picking storage area can be retrieved for assembling custom or mixed pallets 150B.

As explained in further detail below, in response to receiving an order that involves assembly of a mixed pallet 150B, an ASRS and/or item retrieval device can retrieve trays with layers 151 and/or individual items 152 from the rack structures included in the order picking storage area 142, and place the layers 151 and/or individual items 152 on an automated conveyor system. Any layers 151 retrieved from rack structures can then be transported to one or more layer handling devices that are configured to operate in a palletizing operational mode 452 to assemble mixed pallets 150B and/or used to create a new pallet. Any individual items 152 retrieved from rack structures can then be transported to one or more workstations where the individuals items 152 are added to assemble mixed pallets and/or used to create a new pallet. The assembled pallets can then be transported via an automated conveyor system to the outbound processing section 120 and loaded on delivery vehicles 105. In some scenarios, the assembled mixed pallets can be temporarily stored in in storage section 130 (or another storage area) before being transported to outbound processing section 120.

Further details relating to exemplary configurations of the layer handling devices are described in further detail below with reference to FIGS. 4A-4I. Further details relating to exemplary configurations of the item retrieval devices are described in further detail below with reference to FIGS. 5-7.

It should be noted that the warehouse facility 100 illustrated in FIG. 2A is merely an example of a warehouse facility 100, and that the warehouse facility 100 can be varied in many ways. For example, any sections of the warehouse facility 100 can be combined, any sections of the warehouse facility 100 can be omitted, and the warehouse facility 100 can include additional sections other than those described herein.

Figure 2B:
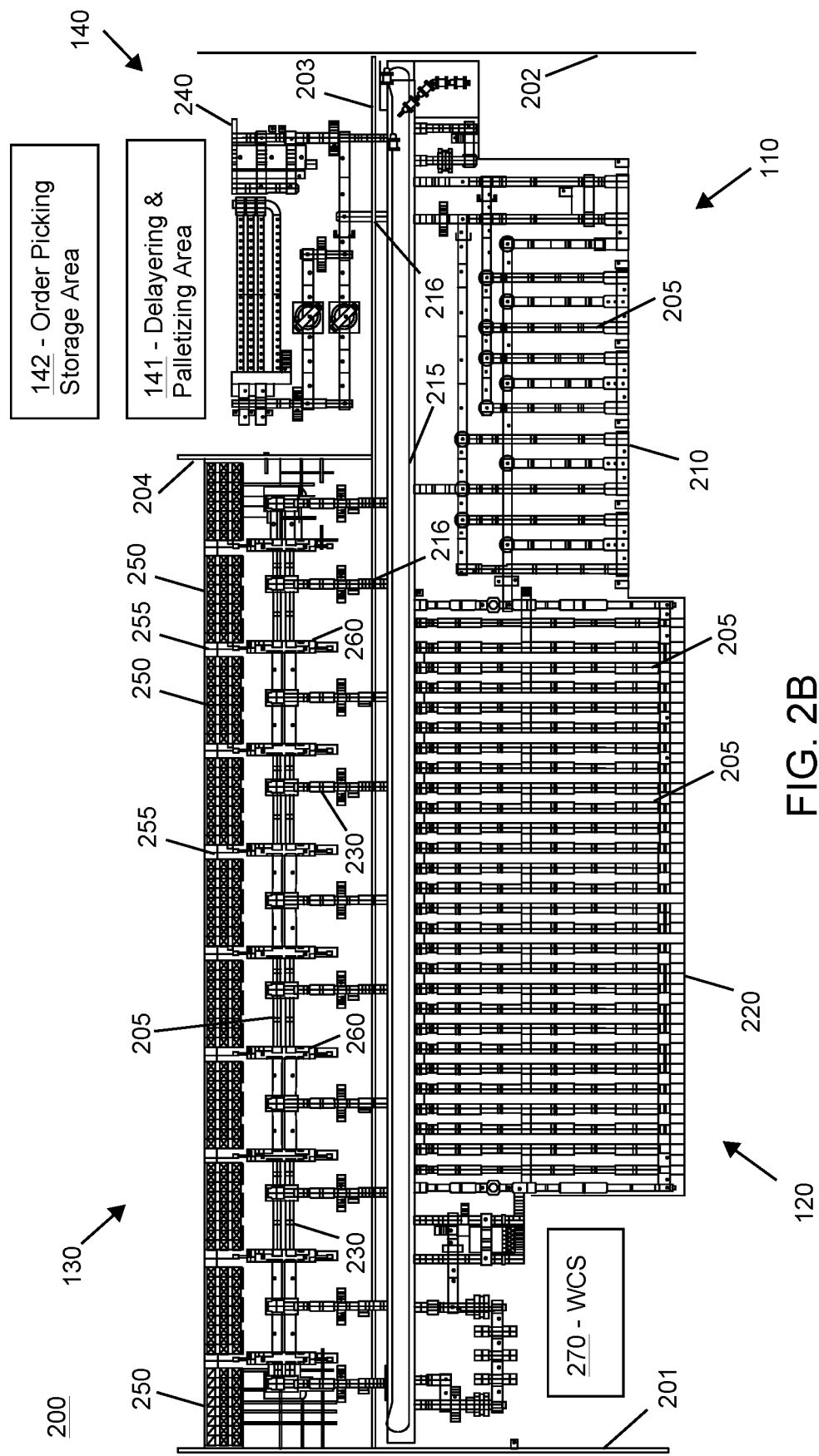
FIG. 2B is an exemplary layout for a portion of a warehouse according to certain embodiments.

FIG. 2B discloses an internal layout 200 of an exemplary warehouse facility 100 (or at least a portion thereof) according to certain embodiments. As mentioned above, the exemplary warehouse facility 100 can include an inbound processing section 110, an outbound processing section 120, a storage section 130, and an order picking section 140. In certain embodiments, the order picking section 140 can include, inter alia, a delayering and palletizing area 141 and an order picking storage area 142.

In certain embodiments, the internal configuration of the warehouse facility 100 includes a plurality of wall structures (201, 202, 203, 204) that separate some or all of these sections. For example, in this exemplary layout 200, the inbound processing section 110 and an outbound processing section 120 can be an area defined by wall structure 201, wall structure 202, and wall structure 203. The storage section 130 can be an area defined by wall structure 201, wall structure 203, and wall structure 204. The order picking section 140 can be an area defined by wall structure 202, wall structure 203, and wall structure 204. Wall structure 203 separates the inbound processing section 110 and outbound processing section 120 from the storage section 130 and the order picking section 140. Wall structure 204 separates the order picking section 140 from the storage section 130. In some cases, another wall structure may be used to separate the delayering and palletizing area 141 from the order picking storage area 142. Other arrangements of wall structures can be provided than those depicted, and any of the wall structures shown can be omitted and/or additional wall structures can be included.

The inbound processing section 110 can include an inbound conveyor system 210. The inbound conveyor system 210 can include one more automated conveyors 205 configured to transport pallets 150 (e.g., pallets 150 received from delivery vehicles 105) to the storage section 130 and/or the order picking section 140.

In certain embodiments, the automated conveyors 205 included in the inbound conveyor system 210 can be connected to an intermediate conveyor system 215, which also comprises one or more automated conveyors 205. The intermediate conveyor system 215 can be arranged in loop in some cases. Pallets 150 received via the inbound conveyor system 210 can be transported to the intermediate conveyor system 215 which, in turn, can transport the pallets 150 to conveyor systems located in the storage section 130 and order picking section 140 (e.g., such as storage conveyor system 230 and order picking conveyor system 240 described below). Wall structure 203 can include openings or gates 216 that permit passage of the pallets 150 through the wall structure 203 and into the storage section 130 and order picking section 140.

In certain embodiments, the pallets 150 transported to the storage section 130 can include homogenous pallets 150A, and the homogenous pallets 150A can be stored on the storage racks 250 included in the storage section 130. Mixed pallets 150B also can be transported to the storage section 130 and stored on the storage racks 250 before being transported to outbound processing section 120. In certain embodiments, one or more ASRSs 260 included in the storage section 130 are configured to retrieve the mixed pallets 150B and/or homogenous pallets 150A from the storage conveyor system 230, and place the homogenous pallets 150A onto storage racks 250. The storage racks 250 may include shelves and/or rack structures for storing the pallets 150.

In certain embodiments, the pallets 150 transported to the order picking section 140 can be transported to, and processed by, one or more layer handling devices included in a delayering and palletizing area 141. In the delayering and palletizing area 141, the pallets 150 can be separated into layers 151 and placed onto trays by the layer handling devices. One or more automated conveyors 205 then may be utilized to transport the trays with the layers 151 to the order picking storage area 142. The order picking storage area 142 can include one or more storage racks 250 for storing the layers 151. One or more ASRSs 260 included in the order picking storage area 142 may retrieve the trays and layers from the order picking conveyor system 240 and place the trays with the layers on the storage racks 250.

Further details of the delayering and palletizing area 141 and order picking storage area 142 are described below with respect to FIGS. 4A-4I and 5-7.

The automated conveyors 205 included in the outbound conveyor system 220 can be connected to the intermediate conveyor system 215. During fulfillment of an order, homogenous pallets 150A stored in the storage racks 250 of the storage section 130 may be retrieved by one or more ASRSs 260 and placed on the storage conveyor system 230. In certain embodiments, the storage conveyor system 230 transports the homogenous pallets 150A to the intermediate conveyor system 215 which, in turn, transports the homogenous pallets 150A to the outbound conveyor system 220 for loading on delivery vehicles 105.

Additionally, or alternatively, the layers 151 stored in the storage racks 250 in the order picking storage 142 may be retrieved to assemble mixed pallets 150B during fulfillment of an order. In some cases, one or more ASRSs 260 included in the order picking storage 142 may retrieve trays with stored layers 151 from the storage racks 250, and place the layers 151 and trays on an automated conveyor 205 for transport to one or more layer handling devices included in the delayering and palletizing area 141. Additionally, or alternatively, one or more item retrieval devices included in the order picking storage 142 may retrieve individual items 152 or subsets of items 152 from the layers 151 stored in the order picking storage 142, and place the items 152 on an automated conveyor 205 for transport to one or more workstations where the individuals items 152 are using to assemble mixed pallets 150B.

The layer handling devices included in the delayering and palletizing area 141 can be configured to operate in a palletizing operational mode 452. In the palletizing operational mode 452, the layer handling devices can be configured to assemble mixed pallets 150B by adding the layers 151 retrieved from the order picking storage area 142 to pallets that are being assembled. The mixed pallets 150B can then be transported by the order picking conveyor system 240 to the intermediate conveyor 215 which, in turn, can transport the mixed pallets 150B to the outbound conveyor system 220 for loading on delivery vehicles 105 or, alternatively, can transport the mixed pallets to the storage conveyor system 230 for storage in the storage section 130. Any mixed pallets stored in the storage section 130 can be transported at a later time to the outbound conveyor system 220 for loading on delivery vehicles 105.

In the storage section 130, aisles 255 may be included between the various storage racks 250. Each of the ASRSs 260 included in the storage area may be configured to traverse the aisles 255 along one or more rails that extend the length of the aisles 255. For example, in retrieving a pallet 150 to fulfill an order, an ASRS 260 may traverse an aisle 255 to a location where the pallet 150 is located and retrieve the pallet 150 from a shelf included on one of the storage racks 250. The ASRS 260 can then place the retrieved pallet 150 on the storage conveyor system 230 for delivery to the outbound conveyor system 220.

Similarly, the order picking storage area 142 also may include a plurality of storage racks 250 separated by aisles 255, and the ASRSs 260 and item retrieval devices can be configured to traverse the aisles 255 along one or more tracks or rails that extend the length of the aisles 255. The ASRSs 260 and item retrieval devices can retrieve trays with layers 151 and/or items 152 from the storage racks 250, and place the trays with layers and/or items 152 on the order picking conveyor system 240. The trays with layers can be transported to locations (e.g., to layer handling devices and/or assembly workstations) where they are added to existing pallets 150 or utilized to create a new pallet 150. Further details of the order picking storage area 142 are described below with reference with to FIG. 5.

As described throughout this disclosure, a warehouse control system (WCS) 270 can be configured to automate the functionality of warehouse facility 100 and perform other related functions. For example, in some embodiments, the WCS 270 may be configured to control any of the operations described herein related to controlling the automated equipment (e.g., automated conveyor systems, layer handling devices, ASRSs, item retrieval devices, etc.), facilitating storage of inbound pallets 150 (as well as layers 151 and items 152), facilitating fulfillment of outbound pallets 150, assembling mixed pallets 150B, tracking storage of pallets 150 and layers 151 (e.g., in storage section 130 and order picking storage section 142), monitoring warehouse operations, and/or routing pallets 150, layers 151, and/or items 152 on automated conveyor systems. The WCS 270 may be configured to perform other related functions as well.

It should be noted that the layout 200 illustrated in FIG. 2B is one example of an arrangement for a warehouse facility 100. This layout 200 can be modified in various ways (e.g., by omitting certain sections, adding additional sections, rearranging the sections, etc.). Moreover, the techniques described herein can be applied to any warehouse layout and arrangement.

Additionally, while certain portions of this disclosure may reference particular automated conveyor systems (e.g., inbound conveyor system 210, intermediate conveyor system 215, outbound conveyor system 220, storage conveyor system 230, and/or order picking conveyor system 240) and/or automated conveyors 205 associated with those systems as being separate or distinct, this distinction may be logical rather than physical to aid in the understanding of this disclosure. For example, in certain embodiments, each of the automated conveyor systems may be integrated into a single system (e.g., which is controlled by a single control system). Additionally, or alternatively, one or more of the automated conveyor systems can be separate or distinct systems (e.g., which are separately controlled).

Figure 3:
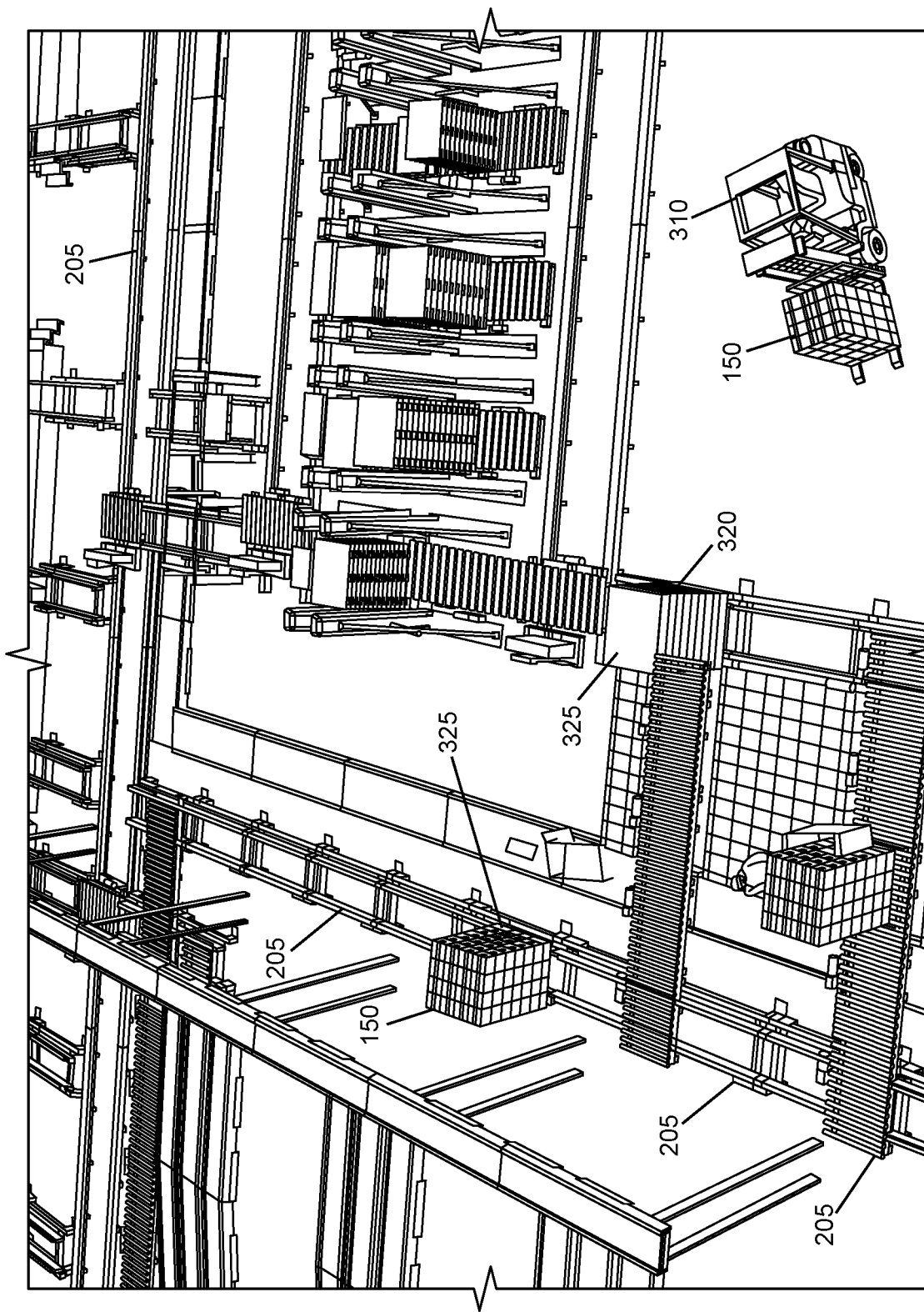
FIG. 3 is an illustration depicting automated conveyors in a warehouse facility according to certain embodiments.

FIG. 3 discloses exemplary automated conveyors 205 transporting pallets 150 according to certain embodiments. The configuration of the automated conveyors 205 can vary. In certain embodiments, functionality of the automated conveyors 205 (or corresponding conveyor systems) may be controlled by the WCS 270 and/or other control system.

Generally speaking, the automated conveyors 205 included in the warehouse 100 (e.g., in the inbound conveyor system 210, intermediate conveyor system 215, outbound conveyor system 220, storage conveyor system 230, and/or order picking conveyor system 240) can include any type of mechanical handling equipment that is configured to transport pallets 150, layers 151 (with or without trays), and/or items 152 from one location to another. In certain embodiments, the automated conveyors 205 included in the warehouse facility 100 may include one or more belt conveyors, one or more motorized roller conveyors, one or more chain conveyors, and/or other types of conveyors. The automated conveyors 205 may include (or be connected to) one or more motors (e.g., one or more electric motors and/or other types of motors) that power the automated conveyors 205 and enable the pallets 150, trays, layers 151, and/or items 152 to be transported using the automated conveyors 205. The functionality of the automated conveyors 205 may be controlled by the WCS 270 and/or other control system.

In certain embodiments, at least a portion of the automated conveyors 205 may include one or more motorized roller conveyors that are configured to transport pallets 150, trays with layers 151, and/or items 152 from one location to another. For example, each of the motorized roller conveyors may include a frame constructed of a rigid material (e.g., steel or aluminum) that includes motorized rollers. In certain embodiments, at least a portion of the automated conveyors 205 may include one or more belt conveyors that include revolving belts that are configured to transport trays 325, pallets 150, trays, layers 151, and/or items 152 from one location to another.

A tray stacker device 320 is configured to store a plurality of trays 325, and to dispense the trays 325 on top of the automated conveyors 205 when needed to transport layers 151 (and, in some embodiments, pallets 150 and/or items 152). The pallets 150, layers 151, and/or items 152 may be placed on top of the trays 325, and the automated conveyors 205 can be used to route the pallets 150, layers 151, and/or items 152 included on the trays 325 to desired locations within the warehouse facility 100.

In some scenarios, one or more transport vehicles 310 can be used to load pallets 150 onto the automated conveyors 205. For example, the transport vehicles 310 may be utilized to unload pallets 150 from delivery vehicles 105 and/or place the pallets 150 onto one or more automated conveyors 205 located in the inbounding processing section 110 and/or order picking section 140.

In some cases, the one or more transport vehicles 310 may represent forklifts that are manually operated by human operators. Additionally, or alternatively, the transport vehicles 310 may represent AGVs. In some embodiments, the AGVs can include computer-controlled, wheel-based load carriers that operate in a warehouse facility 100 (and/or outside the warehouse facility 100) without the need for human operators. The AGVs may be gas, electric, and/or battery powered. In certain embodiments, the AGVs may include cameras, lasers, and/or floor markers to control operation and navigation of the AGVs. The functionality of any AGVs may be controlled by the WCS 270 and/or other control system.

FIGS. 4A-4I illustrate exemplary layer handling devices 410 according to certain embodiments. FIG. 4J is a block diagram illustrating exemplary features and/or components of layer handling devices 410 according to certain embodiments. As mentioned above, the layer handling devices 410 may be located in the delayering and palletizing area 141 and/or other portion of the order picking section 140. The layer handling devices 410 can be configured to operate in both a delayering operational mode 451 and a palletizing operational mode 452. Any functionality of any layer handling devices 410 described in this disclosure may be controlled by the WCS 270 and/or other control system.

The layer handling devices 410 can operate in the delayering operational mode 451 when processing inbound pallets 150 (e.g., pallets 150 received from delivery vehicles 105 and/or pallets 150 received from the storage section 130 to replenish the inventory in order picking storage section 142). In the delayering operational mode 451, the layer handling devices 410 can be configured to grab and remove the top layers 151 from the pallets 150, and place the removed layers 151 onto trays that are transported by the automated conveyors 205. The automated conveyor 205 can then transport the layers 151 to the order picking storage area 142 for storage.

The layer handling devices 410 can operate in the palletizing operational mode 452 during fulfillment of an order. In the palletizing operational mode 452, the layer handling devices 410 can operate in the reverse fashion with respect to the delayering operational mode 451. For example, the layer handling devices 410 can be configured to receive trays with layers 151 of pallets 150 (e.g., from the order picking storage area 142) on automated conveyors 205, and utilize the layers 151 to assemble mixed pallets 150B. In some cases, upon receiving a tray with a layer 151 on an automated conveyor 205, a layer handling device 410 can grab the layer 151, and place the layer 151 on top of a mixed pallet 150B that is being assembled and/or on top of pallet platform structure 153 to begin assembly of a new mixed pallet 150B.

The configuration of the layer handling devices 410 can vary. Generally speaking, the layer handling devices 410 can include any device or apparatus that is capable of grabbing or manipulating a layer 151 of pallet 150 (e.g., in connection with removing the layer 151 from a pallet 150 and/or adding a layer 151 to assemble a pallet 150).

FIGS. 4A-4B and 4F-4H disclose embodiments in which the layer handling devices 410 are integrated into enclosures that are equipped with grabbing portions 415. FIGS. 4C-4D and 4I disclose embodiments of layer handling devices 410 in which the grabbing portions 415 are connected to movable robotic arms 411. The layer handling devices 410 can be configured in other arrangements as well.

Inbound pallets 150 may be transferred to the order picking section 140 in response to new shipments arriving on delivery vehicles 105 and/or in response to the WCS 270 detecting that the inventory in the order picking storage area 142. The pallets 150 may be received at the order picking conveyor system 240. One or more automated conveyors associated with the order picking conveyor system 240 can route the pallets to one or more elevators (see FIG. 4C). Each elevator 430 can include a lower platform upon which a pallet 150 may rest. The elevators 430 can be configured to lift or raise the pallets 150 into shafts 420 that are situated on (or extend through) a surface or level located above the elevators 430. The shafts 420 are hollow and provide an opening through which the pallets 150 may be raised and dissembled.

Figure 4A:
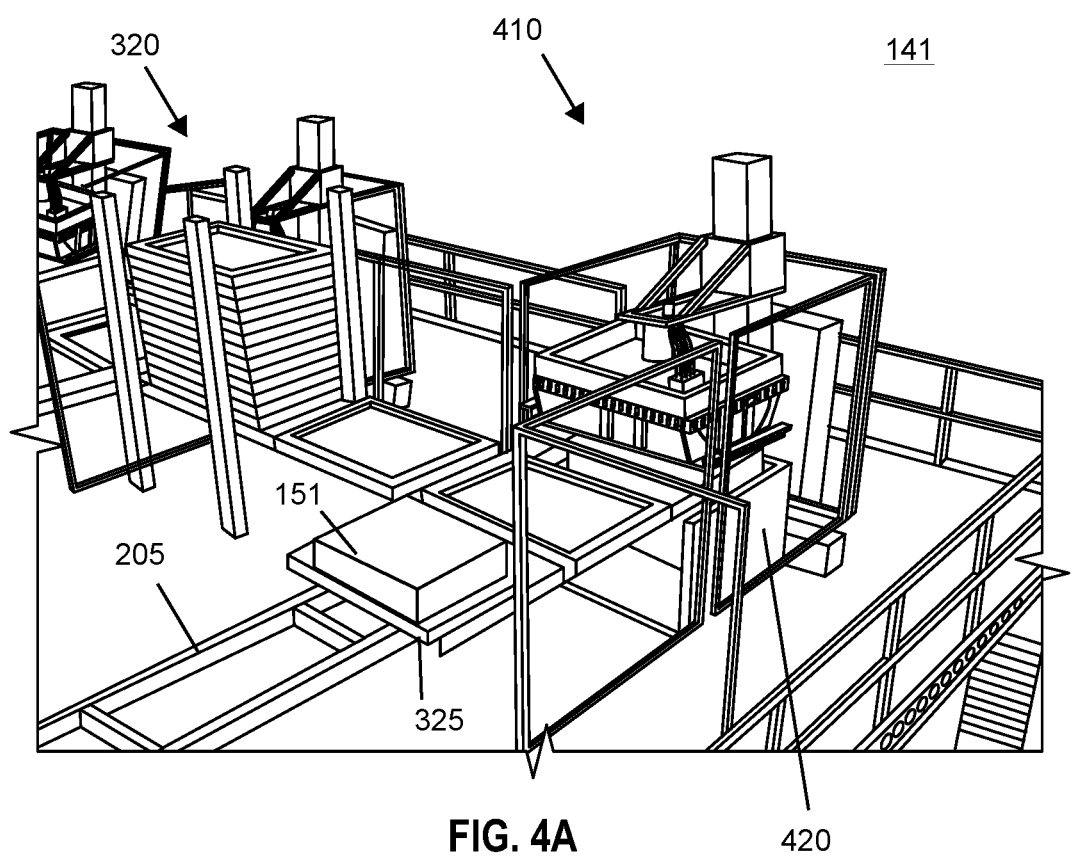
FIG. 4A is an illustration of an exemplary layer handling device according to certain embodiments.
Figure 4B:
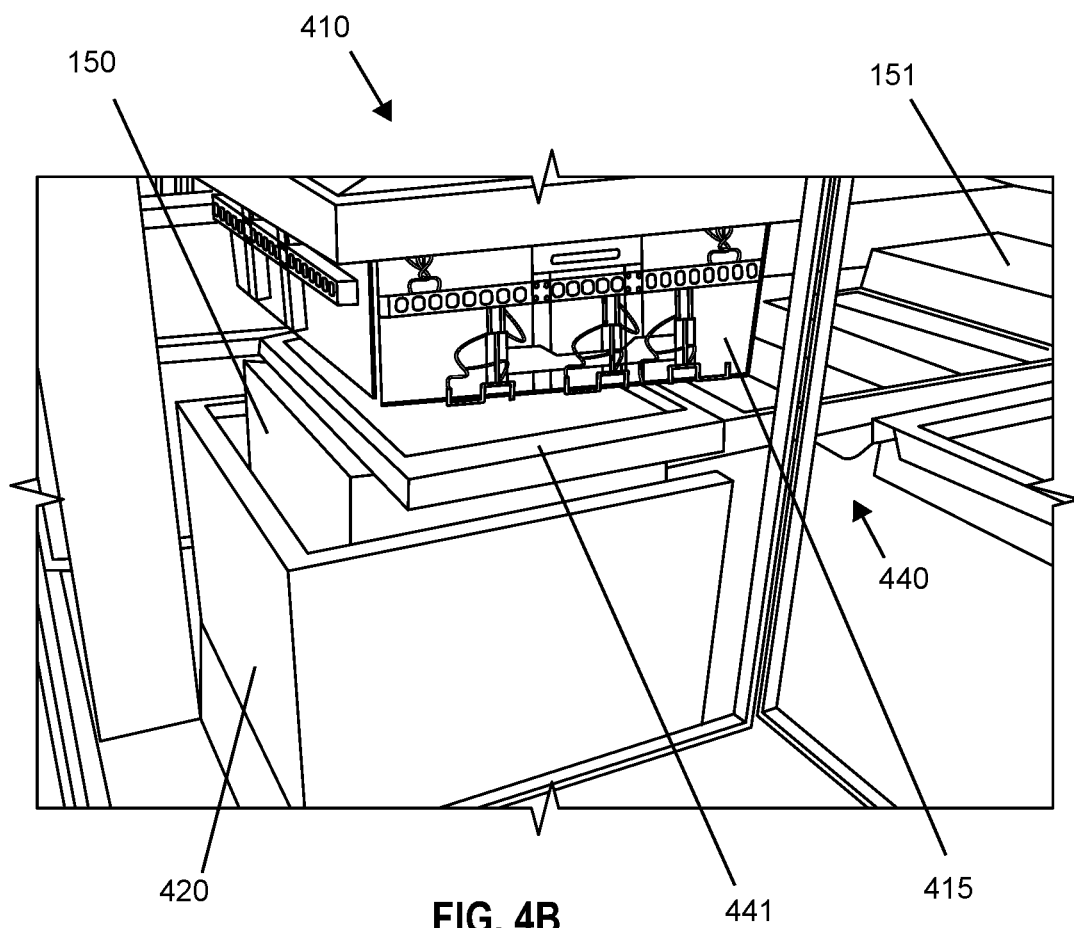
FIG. 4B is another view of the exemplary layer handling device illustrated in FIG. 4A according to certain embodiments.
Figure 4C:
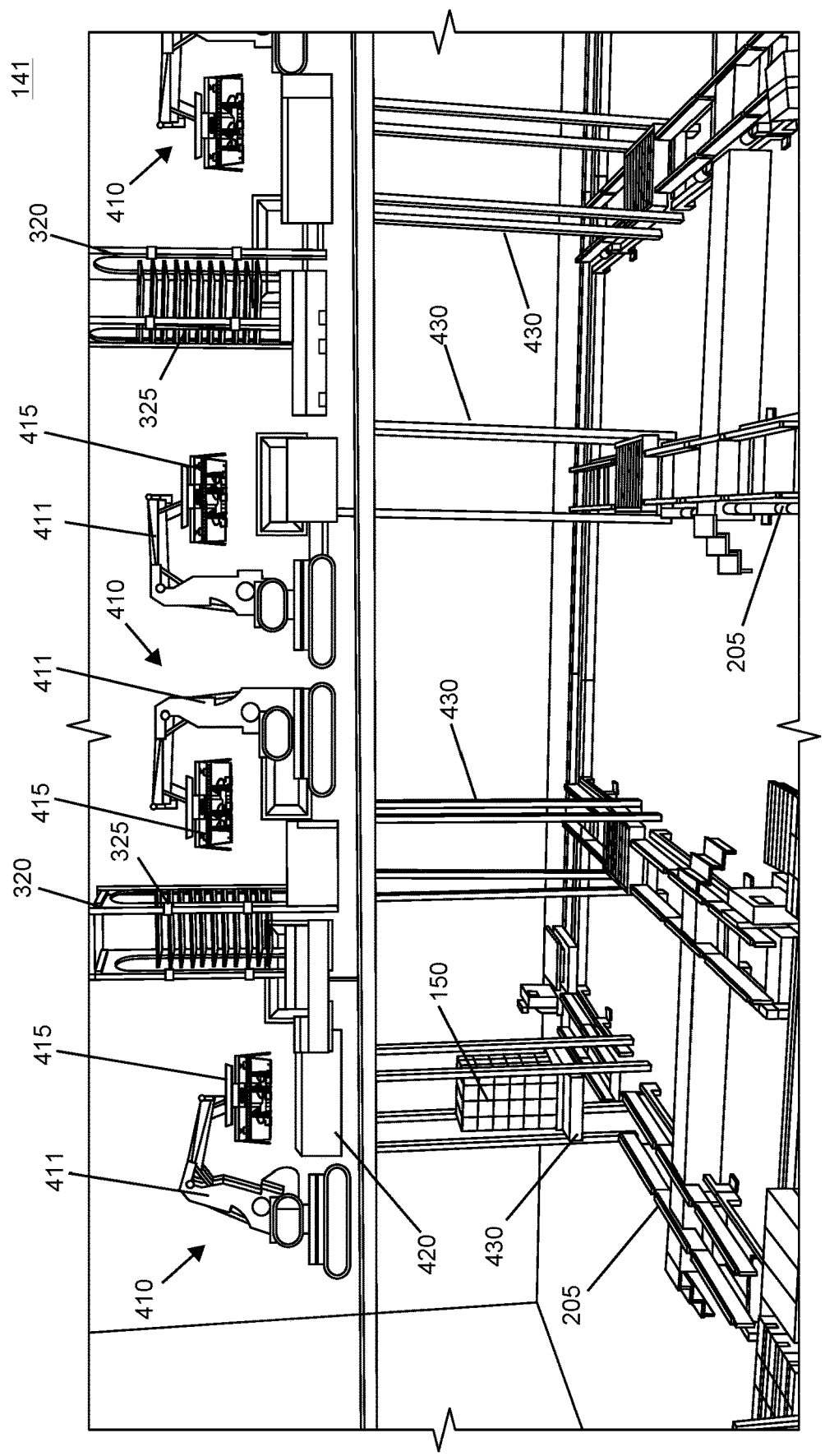
FIG. 4C illustrates a portion of an exemplary delayering and palletizing area according to certain embodiments.
Figure 4D:
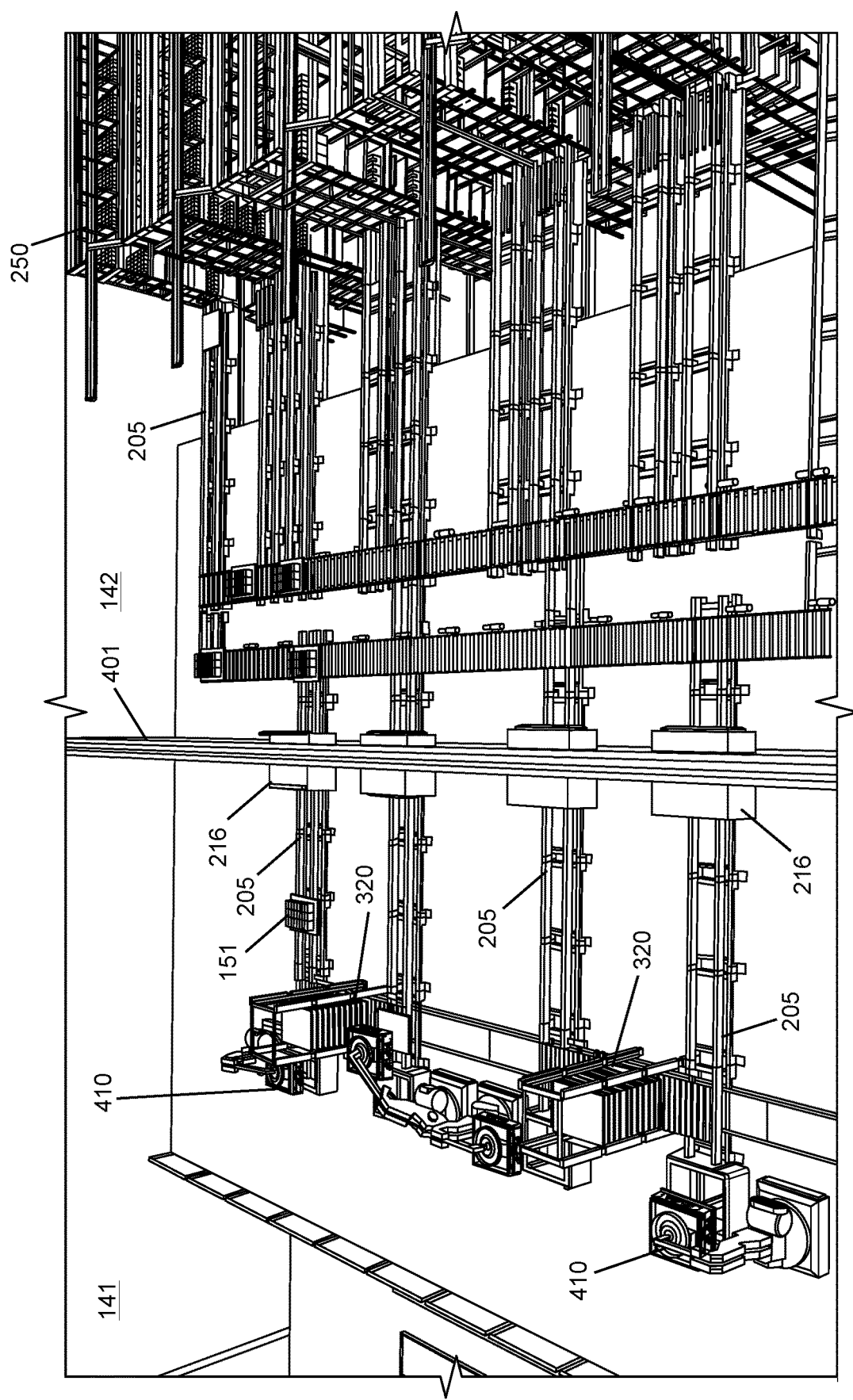
FIG. 4D illustrates portions of an exemplary delayering and palletizing area and order picking storage area according to certain embodiments.
Figure 4E:
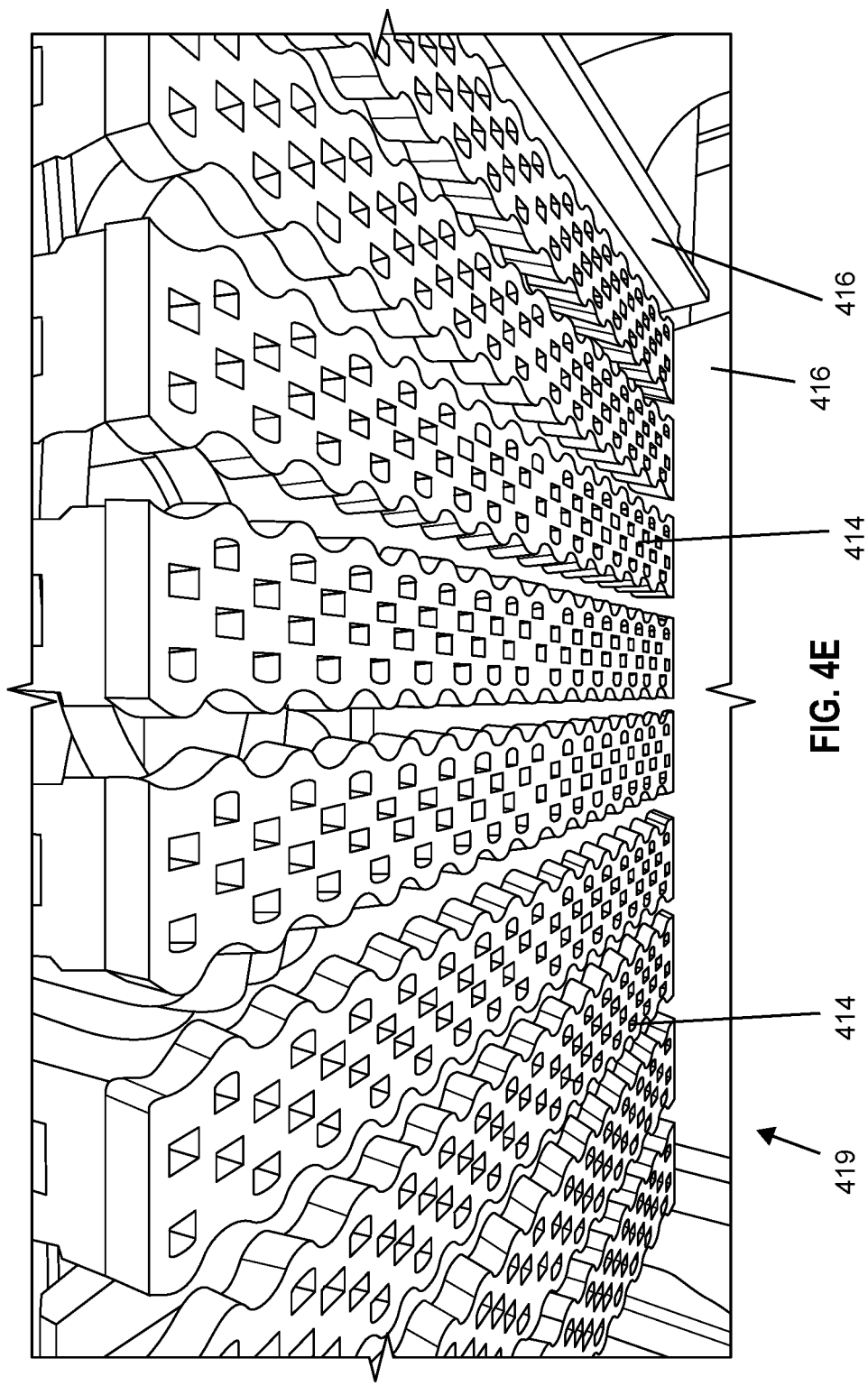
FIG. 4E illustrates exemplary vacuum plates that can be included on a layer handling device according to certain embodiments.

The elevators 430 can raise the pallets 150 to an appropriate level that permits the grabbing portions 415 of the layer handling devices 410 to access and remove the top layers 151 of the pallets 150 (see FIGS. 4A-4B). In certain embodiments, the elevators 430 can utilize a servo-frequency control mechanism to lift the pallets 150 into a working range or reachable range of the grabbing portions 415. After gripping or grabbing layers 151 on the pallets 150, the grabbing portions 415 of the layer handling devices 410 can be elevated or retracted upward to remove the top layers 151 from the pallets 150. The layers 151 can then be transferred to trays 325 and routed to the order picking storage area 142 via one or more automated conveyors 205.

The manner in which the layers 151 are transferred to the trays 315 and/or automated conveyors 205 can vary. In certain embodiments, the layer handling devices 410 may include a tray shift system 440 (see FIGS. 4A-4B and 4F-4H) that transfers the layers 151 to the trays 325. Further details of the tray shift system 440 are described below. Alternatively, or additionally, the layer handling devices 410 may include robotic arms 411 that are able to move layers 151 that are grabbed and place them on the trays (see FIG. 4C-4D). Regardless of the configuration of the layer handling device 410, the elevator 430 can raise or move the pallet 150 upwards each time a layer 151 is removed from the top of a pallet 150 such that the grabbing portion 415 of a layer handling device 410 can access and grab the next layer 151 of the pallet 150.

In certain embodiments, tray stacker devices 320 are located adjacent to the layer handling devices 410, and automated conveyors are situated between the layer handling devices 410 and the tray stacker devices 320. When a top layer 151 is separated from a pallet 150, a tray stacker device 320 can be configured to dispense or output a tray 325 on which the layer 151 is placed. The tray 325 (and layer 151 resting on the tray 325) can then be transported via an automated conveyor to an order picking storage area 142 for placement on a storage rack 250 (see FIG. 4D). As explained in further detail below, the trays 325 included in the tray stacker devices 320 can be automatically replenished or refilled with trays 325 (e.g., with trays 325 that are emptied or unloaded during the assembly of mixed pallets 150B). Any functionality of the tray stacker devices 320 can be controlled by the WCS 270 and/or other control system.

In certain embodiments, a wall structure 401 can separate the delayering and palletizing area 141 from the order picking storage area 142, which may represent a storage area that is refrigerated or cooled to store perishable items 152. The automated conveyor 205 may permit the trays 325 containing the layers 151 to be transported to the order picking storage area 142 through openings or gates 216 included in the wall structure 401.

Like the storage section 130, the order picking storage area 142 can include a plurality of storage racks 250 separated by aisles 255. When trays 325 are positioned near or transported near storage racks 250 in the order picking storage area 142, the trays 325 can then be loaded onto support platforms of ASRSs 260. The ASRSs 260 can be situated in the aisles 255 between the storage racks 250, and each ASRS 260 can be configured to traverse a corresponding aisle 255 (e.g., along one or more guide rails).

For example, upon receiving a tray 325 that includes a layer 151, an ASRS 260 can traverse an aisle 255 to a location identified by a WCS 270 for storage of the tray 325. The ASRS 260 can then elevate the tray 325 using its movable platform, and push the tray 325 into a designated storage position. The tray 325 and layer 151 can then be stored in the storage rack 250 until the layer 151 is needed to fulfill an order.

The process flow in the order picking section 140 of the warehouse facility operates in a reverse manner when fulfilling orders. In some embodiments, receiving an order will cause the WCS 270 to initiate a process for assembling a mixed pallet using one or more of the layers 151 stored in the order picking storage section 142. In response to receiving the order, the WCS 270 may identify the location of a layer 151 (or a plurality of layers 151) in the storage racks 250 to be used in assembling the mixed pallet 150B. An ASRS 260 located in the aisle 255 where the layer 151 is stored may traverse the aisle 255 to the location of the layer 151. The ASRS 260 can include a gripper portion that is configured to pull the tray 325 containing the layer 151 out from the storage rack 250 and onto the support platform of the ASRS 260. The ASRS 260 can then deliver the tray 325 to an automated conveyor 205 positioned in front of the aisle 255. The automated conveyor 205 then routes the tray 325 to a layer handling device 410.

During fulfillment, the layer handling device 410 can be configured in a palletizing operational mode as mentioned above. In this mode, the layer handling device 410 can receive the tray 325 (and associated layer 151) that was retrieved from a storage rack 250 included in the order picking storage area 142. The layer handling device 410 can grab and lift the layer 151 from the tray 325 and add the layer 151 to a pallet 150 that is being assembled.

As shown in FIG. 4I, the pallet 150 being assembled may be situated on the elevator 430 near the opening in the shaft 420. The layer 151 removed from the tray 325 can be placed on top of the pallet 150 supported by the elevator 430. The manner in which the layer handling device 410 transfers to the layer 151 and/or assembles to the pallet 150 being assembled can vary.

For embodiments in which a layer handling device 410 is configured with an enclosure (see FIGS. 4A-4B and 4F-4H), the grabbing portion 415 of the layer handling device 410 can be situated in a retracted or upper position, and a tray 325 can be slid into the enclosure (e.g., using the tray shift system 440) underneath the grabbing portion 415. The grabbing portion 415 may then extend downward to grab the layer 151 included on the tray 325, and lift the layer 151 from the tray 325. The tray 325 then can be routed via an automated conveyor 205 to a nearby tray stacker device 320, and stored in the tray stacker device 320 for subsequent reuse. The layer 151 can then be placed on top of the pallet 150 supported by the elevator 430 and within the shaft 420. The layer handling device 410 can continuously add layers 151 in this manner until the mixed pallet 150B is assembled (or at least a portion thereof is assembled).

For embodiments in which the layer handling device 410 is configured with a robotic arm 411 (see FIG. 4I), the robotic arm 411 can situate the grabbing portion 415 on top of the layer 151 when the tray 325 is situated on an adjacent automated conveyor 205. The robotic arm 411 can then grab and lift the layer 151 from the tray 325, move the robotic arm 411 to a position where the grabbing portion 415 is situated above the pallet 150 being assembled, and place the layer on top of the pallet 150 supported by the elevator 430 and within the shaft 420. The tray 325 then can be routed via an automated conveyor 205 to a nearby tray stacker device 320, and stored in the tray stacker device 320 for subsequent reuse. The layer handling device 410 can continuously add layers 151 in this manner until the mixed pallet 150B is assembled (or at least a portion thereof).

Configuring a layer handling device 410 to appropriately grab layers 151 (e.g., during delayering and/or palletizing) can be technically challenging. One difficulty stems from the fact that the layers 151 or items 152 included in the layers 151 can have varying characteristics (e.g., can vary in weight, size, fragility, etc.), and failing to account for these varying characteristics can damage the items 152 included in the layers. Additionally, the items 152 included in the layer 151 may be damaged if a layer 151 is not centered appropriately under a grabbing portion 415 of a layer handling device 410. Another difficulty relates to handling pallets 150 that include slip-sheets between layers 151 to improve the stability of the pallets 150.

In certain embodiments, the layer handling devices 410 described herein can overcome these and other technical challenges by combining technologies involving vacuum systems, air pump systems, and/or clamping systems. Exemplary configurations are described below.

Figure 4F:
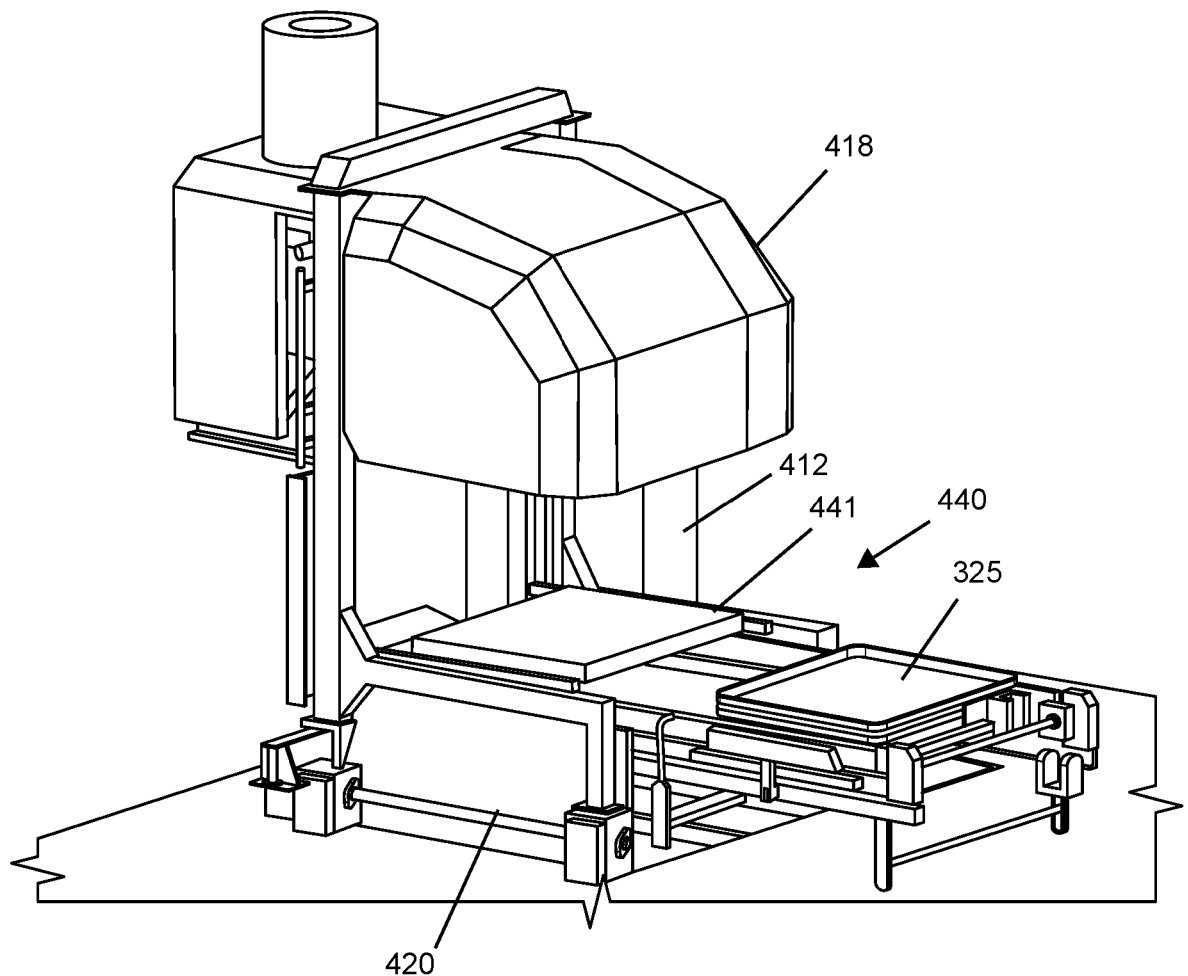
FIG. 4F is an illustration of another exemplary layer handling device according to certain embodiments.
Figure 4G:
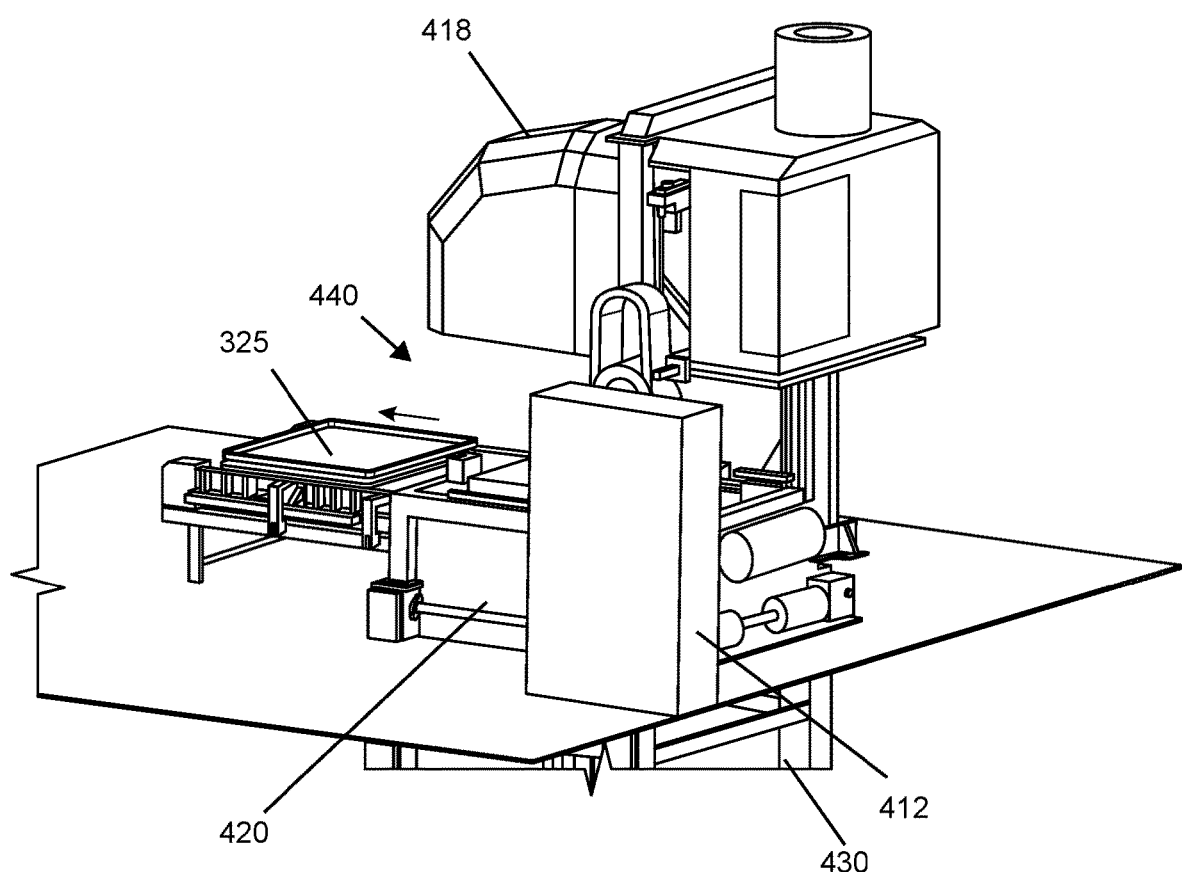
FIG. 4G is another view of the exemplary layer handling device according illustrated in FIG. 4F to certain embodiments.
Figure 4H:
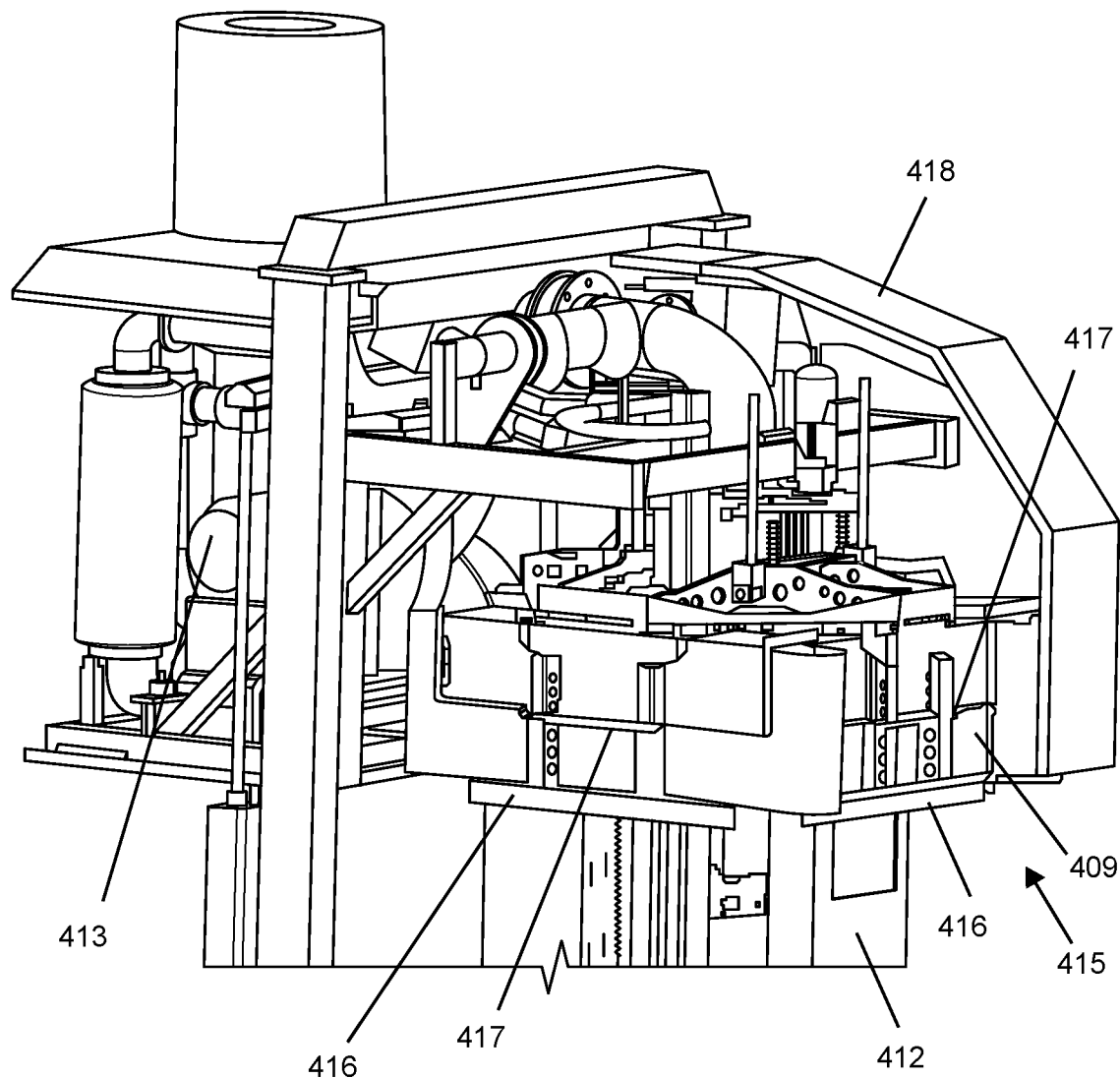
FIG. 4H is an illustration depicting an internal configuration of the exemplary layer handling device illustrated in FIG. 4F according to certain embodiments.
Figure 4I:
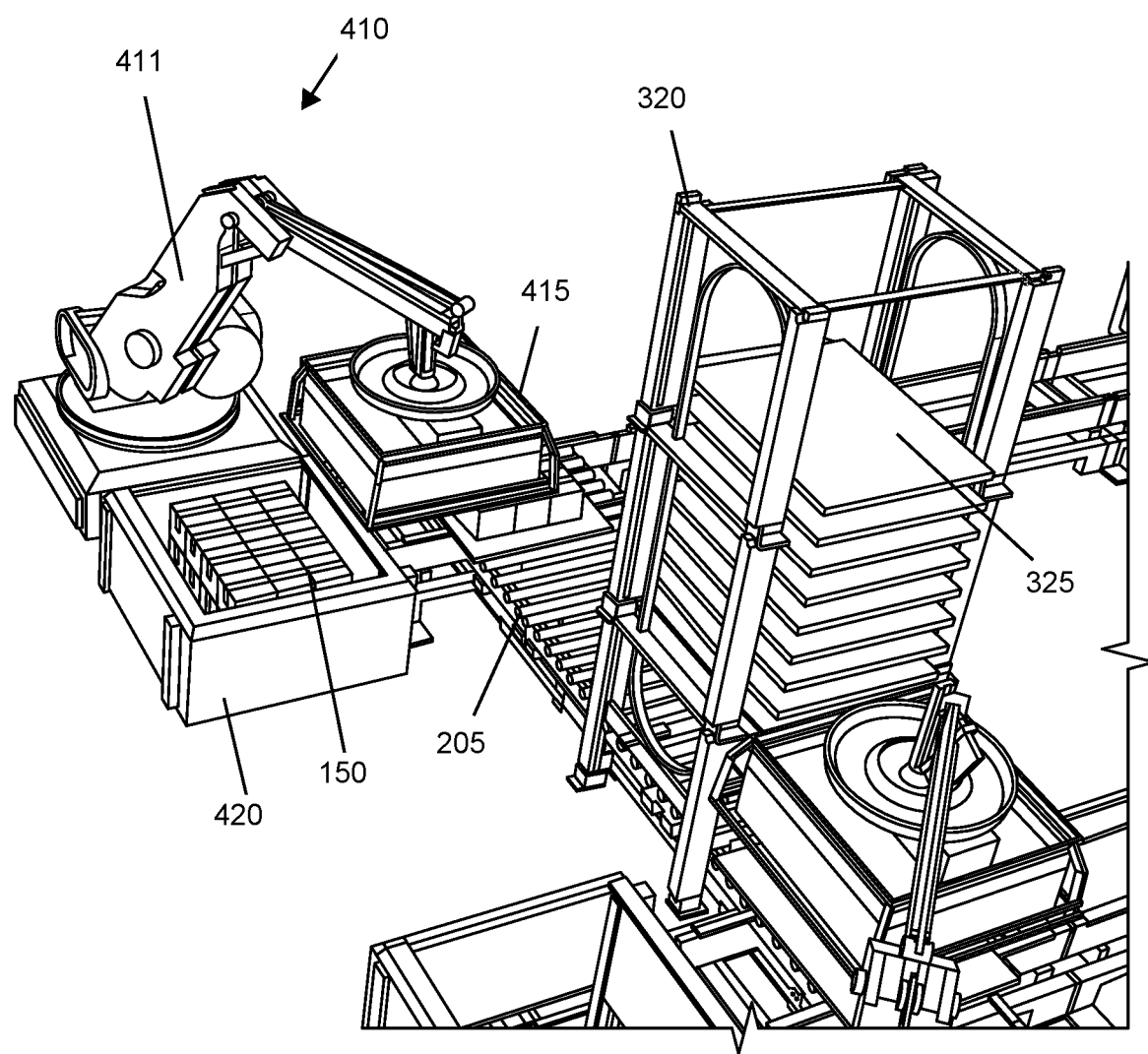
FIG. 4I is an illustration of an exemplary layer handling device configured in a palletizing operational mode according to certain embodiments.
Figure 4J:
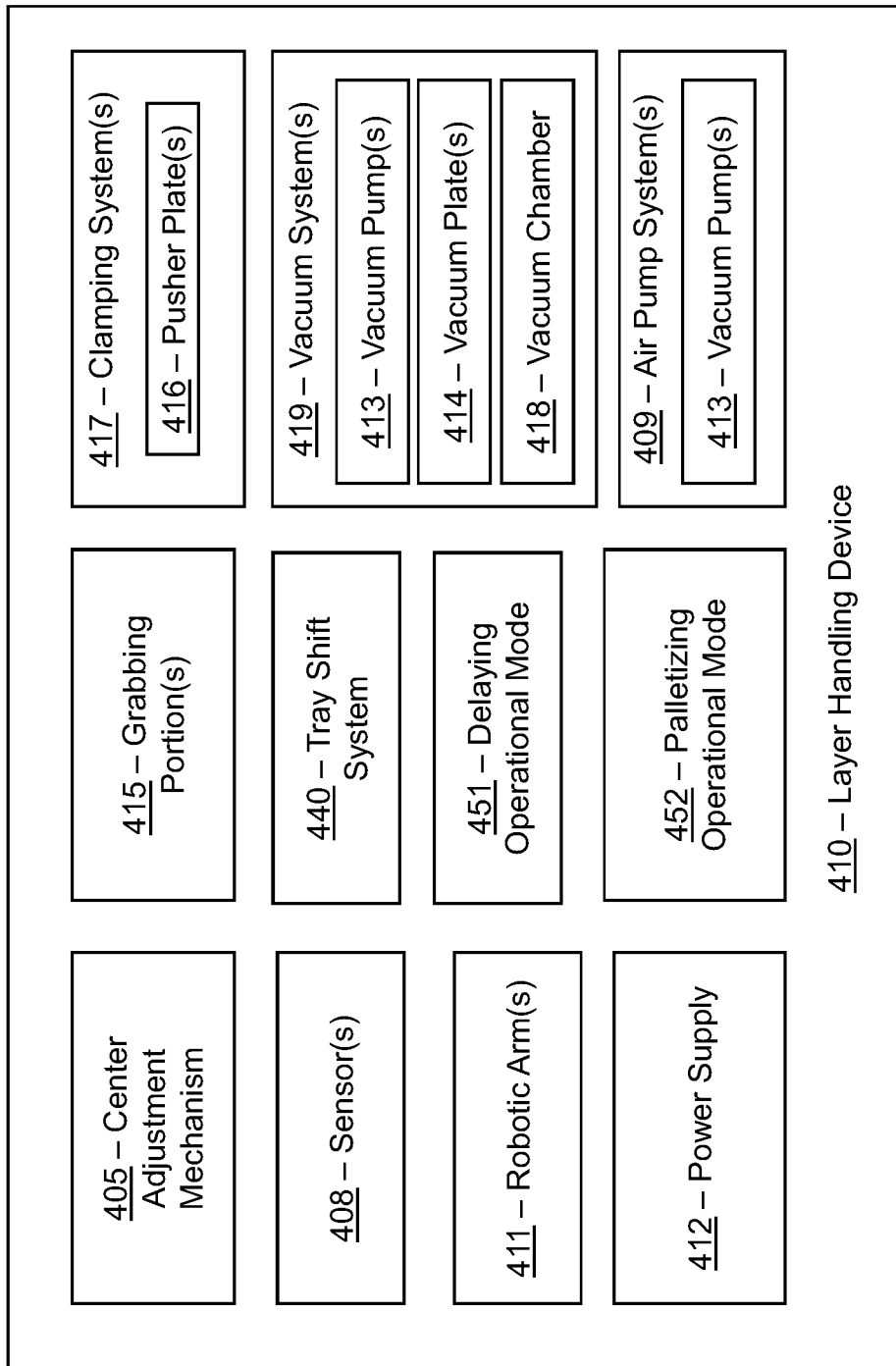
FIG. 4J is a block diagram illustrating exemplary features of a layer handling device according to certain embodiments.

FIGS. 4F-4H disclose an exemplary configuration for a layer handling device 410 according to certain embodiments. In certain embodiments, the layer handling device 410 includes one or more vacuum pumps 413, one or more vacuum plates 414, one or more grabbing portions 415, one or more pusher plates 416, one or more clamping systems 417, one or more vacuum chambers 418, one or more vacuum systems 419, one or more air pump systems 409, and/or one or more tray shift systems 440. The layer handling device further includes one or more power supplies 412 that can be configured to supply power to any the aforementioned components and/or other components of the layer handling device 410.

As illustrated in FIG. 4H, the grabbing portion 415 can be located within the vacuum chamber 418. The grabbing portion 415 can be configured to move up and down within the vacuum chamber 418. The grabbing portion 415 also can be configured to move or shift sideways (frontward, rearward, leftward, and rightward) within the vacuum chamber 418.

The grabbing portion 415 can be arranged in a square or rectangular shape in some cases. Each of the side walls (e.g., four side walls) defining the grabbing portion 415 can be connected (e.g., using brackets) to a clamping system 417 that enables the walls to be moved inward and to retract outward. Each of the side walls also can include a corresponding pusher plate 416. The pusher plates 416 may be connected to the clamping system 417 and/or side walls in some cases. In certain embodiments, each of the side walls and/or pusher plates 416 can be individually controllable by a servo pneumatic system.

On a bottom side of the grabbing portion 415, a recess or opening can be formed to receive a layer 151 of items 152 that is being grabbed or gripped during delayering or palletizing operations (see FIG. 4E). One or more vacuum plates 414 can define a top side of the recess or opening, while the four pusher plates 416 define the sides of the recess or opening. When gripping a layer 151 that is situated within the recess or opening, the servo pneumatic system can precisely measure and control the force with which the pusher plates 416 press against the layer 151 to avoid damaging the items 152 included in the layer 151. In some cases, the layer 151 can be clamped toward the lower edge of the items 152 in the layer to facilitate a more secure grip on the layer 151.

In certain embodiments, the pusher plates 416 can be formed in an inverse or reverse L-shape (Γ) that includes a vertical wall connected to a horizontal wall in a perpendicular manner. When a layer 151 is located within the four vertical walls of the pusher plates 416 connected to each side wall, the clamping system 417 and/or servo pneumatic system can individually control the pusher plates 416 to precisely grip the layer 151.

In certain embodiments, a plurality of vacuum plates 414 form a vacuum system 419 that is placed on top of a layer 151 that is being grabbed or moved by the layer handling device 410. The vacuum plates 414 and/or vacuum system 419 provide suctioning or vacuum functions that assist the layer handling device 410 with grabbing layers 151. In certain embodiments, the vacuum plates 414 and/or vacuum system 419 can include, or be connected to one or more vacuum pumps 413 (e.g., one or more frequency-controlled motors with a relatively low air flow) to facilitate the suctioning and/or vacuum functions.

The configuration of the vacuum plates 414 and/or vacuum system 419 can vary. In certain embodiments, each of the vacuum plates 414 can be formed of a foam (e.g., 30 mm thick EPDM or ethylene propylene diene monomer) or rubber that is deformable, and can include a plurality of holes or chambers through which suctioning is performed. The foam or rubber material used to form the vacuum plates 414 can be beneficial because it permits the grabbing portion 415 to accommodate layers 151 or items 152 of different heights. Additionally, in certain embodiments, the holes or chambers included on the vacuum plates 414 can be sized such that it is not necessary to close non-covered holes or chambers when there are no items 152 located beneath particular holes or chambers.

In certain embodiments, the grabbing portion 415 also can be outfitted with an air pump system 409. The air pump system 409 may be connected to one or more vacuum pumps 413 included in the layer handling device 410. The air pump system 409 can be connected to the same vacuum pumps 413 as the vacuum system 419, or different vacuum pumps 413. While the vacuum system 419 provides for suctioning via the holes or chambers included on the vacuum plates 414, the air pump system 409 can create a vacuum in the area between the pusher plates 416 and the area above the vacuum plates 414 within the vacuum chamber 418.

As mentioned above, certain pallets 150 received at the warehouse facility 100 may include slip sheets between layers 151 of the pallets 150 to increase stability of the pallets 150. In addition to providing assistance with gripping or grabbing a layer 151, the air pump system 409 also can enable a slip sheet underlying a layer 151 to be grabbed and transported with the layer 151 by creating a vacuum within the vacuum chamber 418. For example, in some cases, the air pump system 409 creates a vacuum within the small spaces between items 152 of a layer 152, and the vacuum created between the items 152 enables the slip sheets to be suctioned and moved with the layer 151.

When the layer handling device 410 is operating in a delayering operational mode 451, the air pump system 409 enables a slip sheet to be transported with a corresponding layer 151 and placed on a tray 325 for storage in the order picking storage area 142. When the layer handling device 410 is operating in a palletizing operational mode 452, the air pump system 409 enables a slip sheet to be moved with a layer 151 from a tray 325 and placed onto a pallet 150 that is being assembled. Thus, the air pump system 409 allows the layer handling device 410 to assemble mixed pallets 150B without losing the benefits of slip-sheets.

In certain embodiments, layer handling device 410 also can include a tray shift system 440 (see FIG. 4F) as mentioned above. The tray shift system 440 can assist with transferring layers 151 removed from a pallet 150 onto trays 325 when the layer handling device 410 is operating in a delayering operational mode 451. The trays 325 and layers 151 can then be transferred via an automated conveyor system to the order picking storage area 142 for storage on one or more storage racks 250.

The configuration of the tray shift system 440 can vary. In certain embodiments, a pallet 150 is initially raised beneath the layer handling device 410. As mentioned above, the pallet 150 may be raised by an elevator 430 via a shaft 420 (see FIG. 4G) located beneath the layer handling device 410. After the grabbing portion 415 of the layer handling device 410 removes a layer 151 from the pallet 150, the grabbing portion 415 may retract upward into the vacuum chamber 418 while holding the layer 151. In some cases, the elevator 430 may then move the pallet 150 slightly downward to prevent interference with the tray shift system 440.

Thereafter, a sliding platform 441 included in the tray shift system 440 can be slid underneath the grabbing portion 415 and/or vacuum chamber 418. The grabbing portion 415 may then extend downward and place the layer 151 on a tray 325 included on the sliding platform 441. The sliding platform 441 can then slide laterally into a second position adjacent to a tray 325 situated on an automated conveyor 205. A mechanical arm, pusher, or other device can then push the tray 325 and layer 151 onto the automated conveyor 205.

When the sliding platform 441 is moved to the second position near the automated conveyor, the shaft 420 of the elevator is not blocked by the sliding platform 441 and the grabbing portion 415 can access the pallet 150 situated on the elevator 430. The pallet 150 may once again be raised by the elevator 430 so that the grabbing portion 415 has access to the layer 151 currently located on top of the pallet 150. The grabbing portion 415 may then grab the top layer 151 of the pallet 150. The process can then repeat itself such that the tray shift device 440 continuously transfers layers 151 to trays 325 and, in turn, the automated conveyor 205 until there are no more layers 151 left in the pallet 150.

In certain embodiments, the tray shift system 440 also can assist with transferring layers 151 from the order picking storage area 142 to the layer handling device 410 when the layer handling device 410 is operating in a palletizing operational mode 452. For example, in certain embodiments, the trays 325 and layers 151 received from the order picking storage area 142 may be transferred via an automated conveyor 205 to the sliding platform 441 of the tray shift system 440. The sliding platform 441 may then slide into a position beneath the grabbing portion 415 and/or vacuum chamber 418, and the grabbing portion 415 may grab and remove the layer 151 from the tray 325 on the sliding platform 441. The tray shift system 440 can then slide to a second position away from the grabbing portion 415 to enable the grabbing portion 415 to place the layer 151 on a pallet 150 being assembled on the elevator 430. When the sliding platform 441 is located in the second position, the tray 325 may be transferred to an automated conveyor 205 that routes the tray to a tray stacker device 320 for storage.

In certain embodiments, the layer handling devices 410 can include a center adjustment mechanism 405 that is configured to improve the gripping or grabbing of layers 151 that are not centered on underlying pallets 150 and/or that are not centered under grabbing portions 415 of the layer handling devices 410. In such scenarios when a non-centered layer is being gripped, each of the four pusher plates 416 can be individually moved and controlled to apply pressure on the layer 151, and the force applied to the layer 151 can be measured (e.g., using one or more pressure sensors and/or other sensors). The measured force that is applied to the layer 151 can be used to calculate exactly where the center point (labeled C in FIG. 1B) of the layer 151 is located. Having determined the center point of the layer 151, the grabbing portion 415 can then be shifted (e.g., left, right, frontwards, or backwards) to the appropriate location directly above the center point of the layer 151. Then layer 151 can then be grabbed when the center point of the grabbing portion 415 is centered with the underlying layer 151.

When the layer handling device 410 is operating in a delayering operational mode 451, the calculated center position also can be used to precisely position a tray 325 beneath the layer 151 on the sliding platform 441. For example, in some cases, after the grabbing portion 415 is retracted into the vacuum chamber 418 while grabbing the layer 151, a tray 325 situated on the sliding platform 441 may be positioned beneath the grabbing portion 415 and the tray 325 can be positioned based on the measured center position. The grabbing portion 415 can then extend downward and place the layer 151 onto the tray 325.

The center adjustment mechanism 405 described above permits the layer handling device 410 to grab layers 151 that are not centered appropriately. This can be advantageous to avoid damaging items 152 included in the layers 151, and to avoid disruptions in delayering operations. This also can be advantageous to ensure layers 151 are properly placed on trays 325.

In certain embodiments, the clamping system 417 of the grabbing portion 415 also can utilize predetermined operation settings to further ensure items 152 in layers 151 are not damaged by the grabbing portion 415. For example, the WCS 270 and/or other control system associated with the grabbing portion 415 may store a plurality of predetermined settings based on the characteristics of items 152 that are being processed by the layer handling devices. The different operational settings can account for the weight of the items (e.g., light vs. heavy), the fragility of the items (e.g., fragile vs. sturdy), and/or other item characteristics. The operational settings may be used to control the manner in which the clamping system 417 grabs the layers 151 (e.g., to adjust the pressure applied to the layers 151 by the clamping system 417). In certain embodiments, one of a plurality of operational settings are selected to preconfigure the layer handling device 410 prior to processing the layers 151.

As demonstrated above, the configuration of the layer handling devices 410 can vary and, in many cases, can include various improvements (e.g., such as the grabbing technologies, center adjustment mechanisms, and clamp operation settings) that permit the layer handling devices 410 to accommodate layers 151 and items 152 of varying types and ensure the safety of the items 152 included in the layers 151.

Various modifications can be incorporated into the layer handling devices 410 described herein, and any features associated with a particular embodiment can be combined or integrated with any other embodiments. Moreover, other types of layer handling devices 410 also be utilized to process pallets 150.

Figure 5:
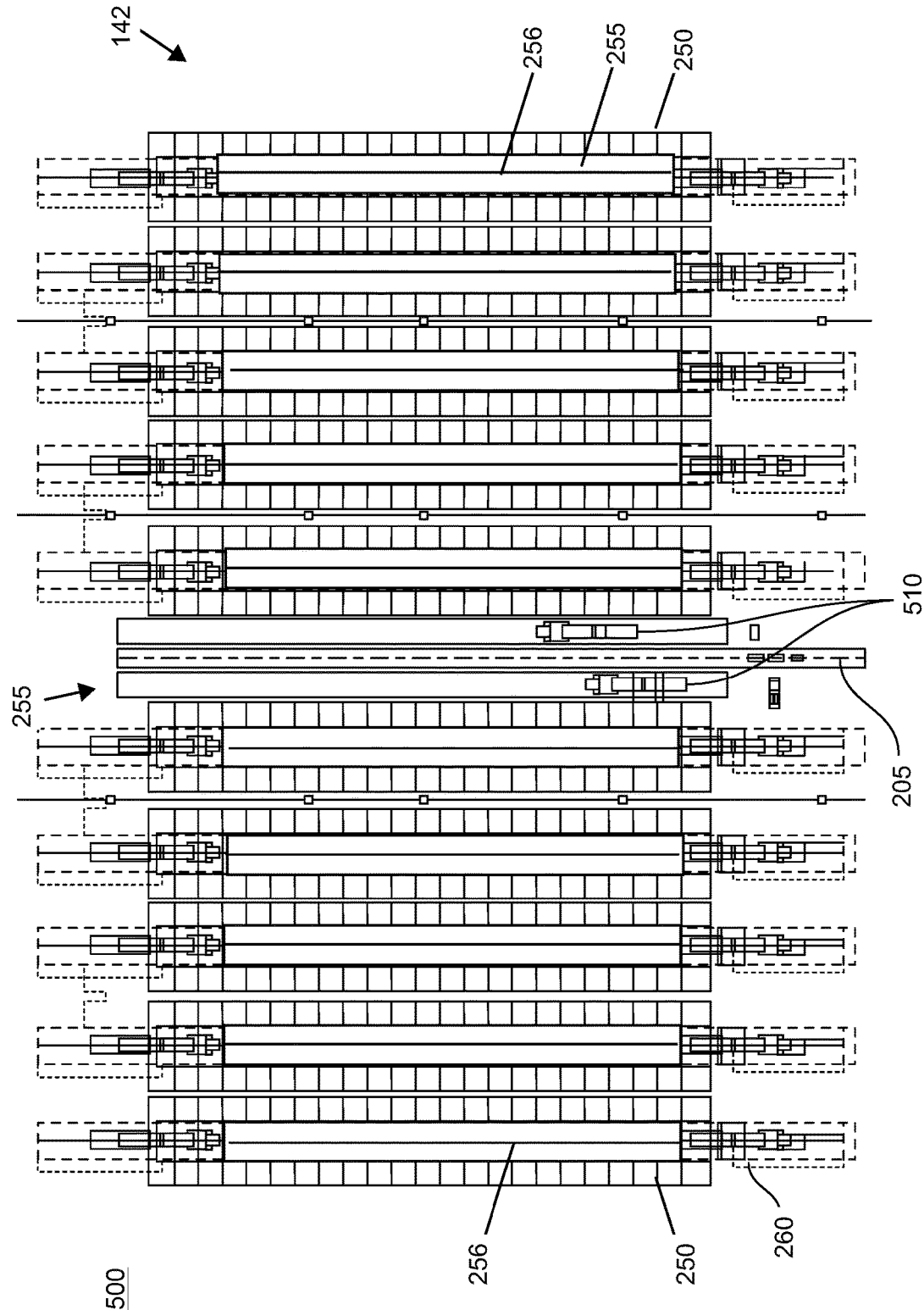
FIG. 5 is an exemplary layout for an order picking storage area according to certain embodiments.

Moving on to FIG. 5, an exemplary layout 500 for an order picking storage area 142 according to certain embodiments. The order picking storage area 142 can store trays with layers 151 for assembling mixed pallets 150B. In certain embodiments, the order picking storage area 142 is a physically separate area from the storage section 130 where full pallets 150 are stored. In certain embodiments, the order picking storage area 142 may represent a portion of the storage section 130. In some embodiments, the order picking storage area 142 and/or storage section 130 can be refrigerated and/or cooled to facilitate storage of perishable items 152.

Like storage section 130, the order picking storage area 142 can include a plurality of storage racks 250 that are separated by aisles 255. In each aisle 255, an ASRS 260 can be configured to traverse the aisle 255 along a guide rail 256. The ASRSs 260 can receive trays and corresponding layers 151 from automated conveyors 205 (e.g., after the layers 151 are removed by layer handling devices 410) and place the layers 151 into rack positions for storage based on storage locations identified by the WCS 270. Likewise, in fulfilling orders, the ASRSs 260 can retrieve trays with layers 151 from the storage racks 250 based on storage locations identified by the WCS 270, and place the retrieved trays and layers onto automated conveyors 205 for transport to layer handling devices 410 that use the layers to assembled mixed pallets 150B.

In this exemplary layout 500, the center aisle 255 is wider than the other aisles, and one or more item retrieval devices 510 are located in the center aisle 255. In certain embodiments, any aisles 255 that include an item retrieval device 510 may be wider than other aisles 255 (e.g., those that include ASRSs 260) in the order picking storage area 142.

Like the ASRSs 260, each of item retrieval devices 510 can traverse the aisles along one or more guide rails. Each of the item retrieval devices 510 are able to grab individual items 152 or multiple items 152 from a designated layer 151 stored on a tray in the storage racks 250 that are located adjacent to the center aisle 256. In certain embodiments, the items 152 retrieved by an item retrieval device 510 can be placed on an automated conveyor 205 that extends the length of the aisle 255 where the item retrieval deice 510 is located. The automated conveyor 205 can then transport the items 152 to a workstation, where the items can be added to a top layer of a mixed pallet 150B (e.g., which was assembled by the layer handling device 410), a top layer of a homogenous pallet 150A (e.g., received form the storage section 130), and/or a new pallet 150 (e.g., an initial layer 151 on a pallet platform structure 153).

It should be noted that the layout 500 illustrated in FIG. 5 is one example of an arrangement for an order picking storage area 142. This layout 500 can be modified in various ways (e.g., by omitting, adding, and/or rearranging the storage racks 250, layer pick aisles 255, item pick aisles 255, etc.). Moreover, in certain embodiments, the order picking storage area 142 can be integrated into, or included within, other sections of the warehouse facility 100 (e.g., storage section 130).

The configuration of the item retrieval devices 510 can vary. In certain embodiments, the item retrieval devices 510 can represent any unmanned or automated devices that are capable of retrieving a single item 152 or subset of items 152 from a layer 151 (e.g., a layer 151 stored in a storage rack 250). Any functions performed by the item retrieval devices 510 can be controlled by the WCS 270 and/or other control system.

Figure 6:
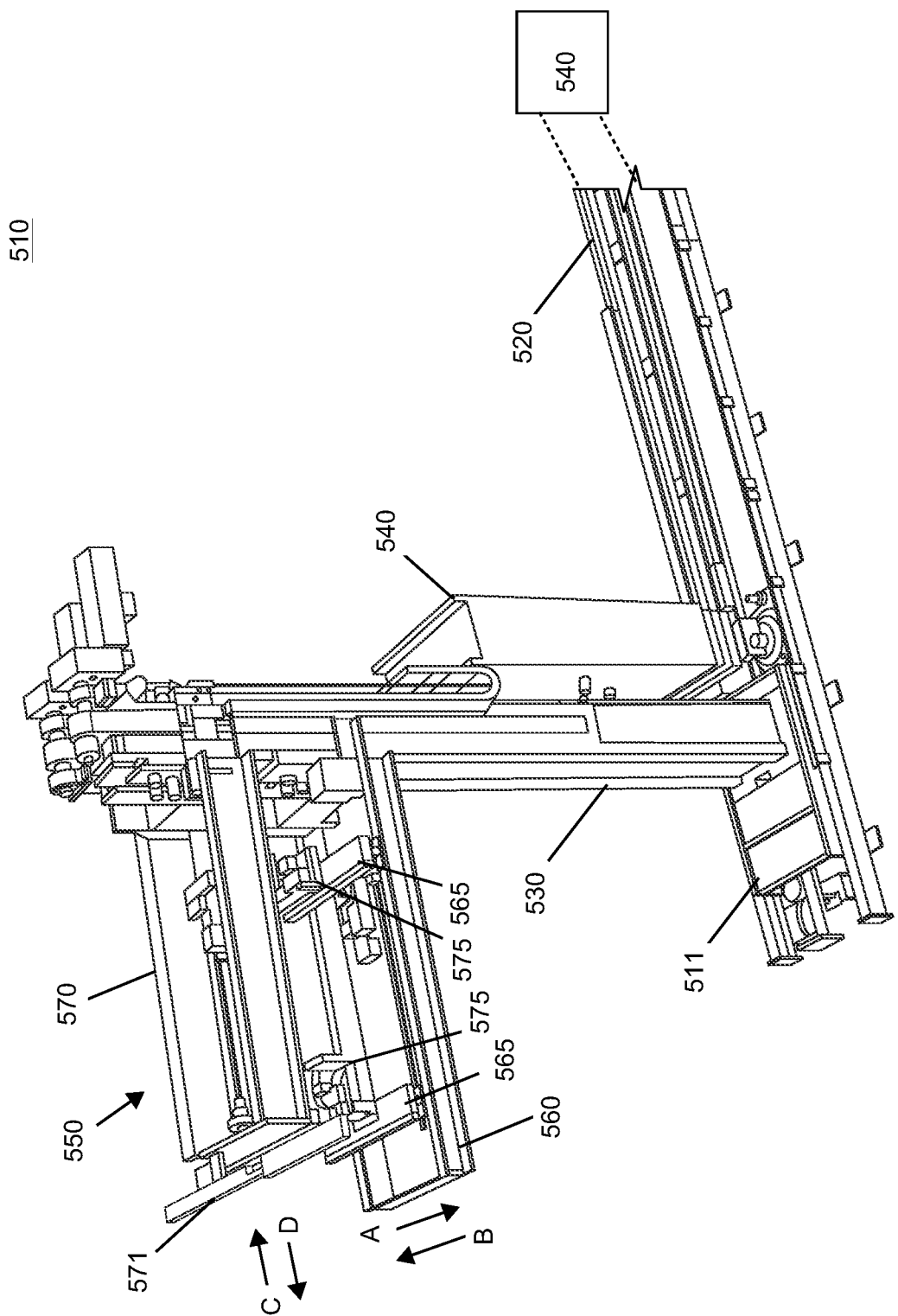
FIG. 6 is an illustration of an exemplary item retrieval device according to certain embodiments.
Figure 7:
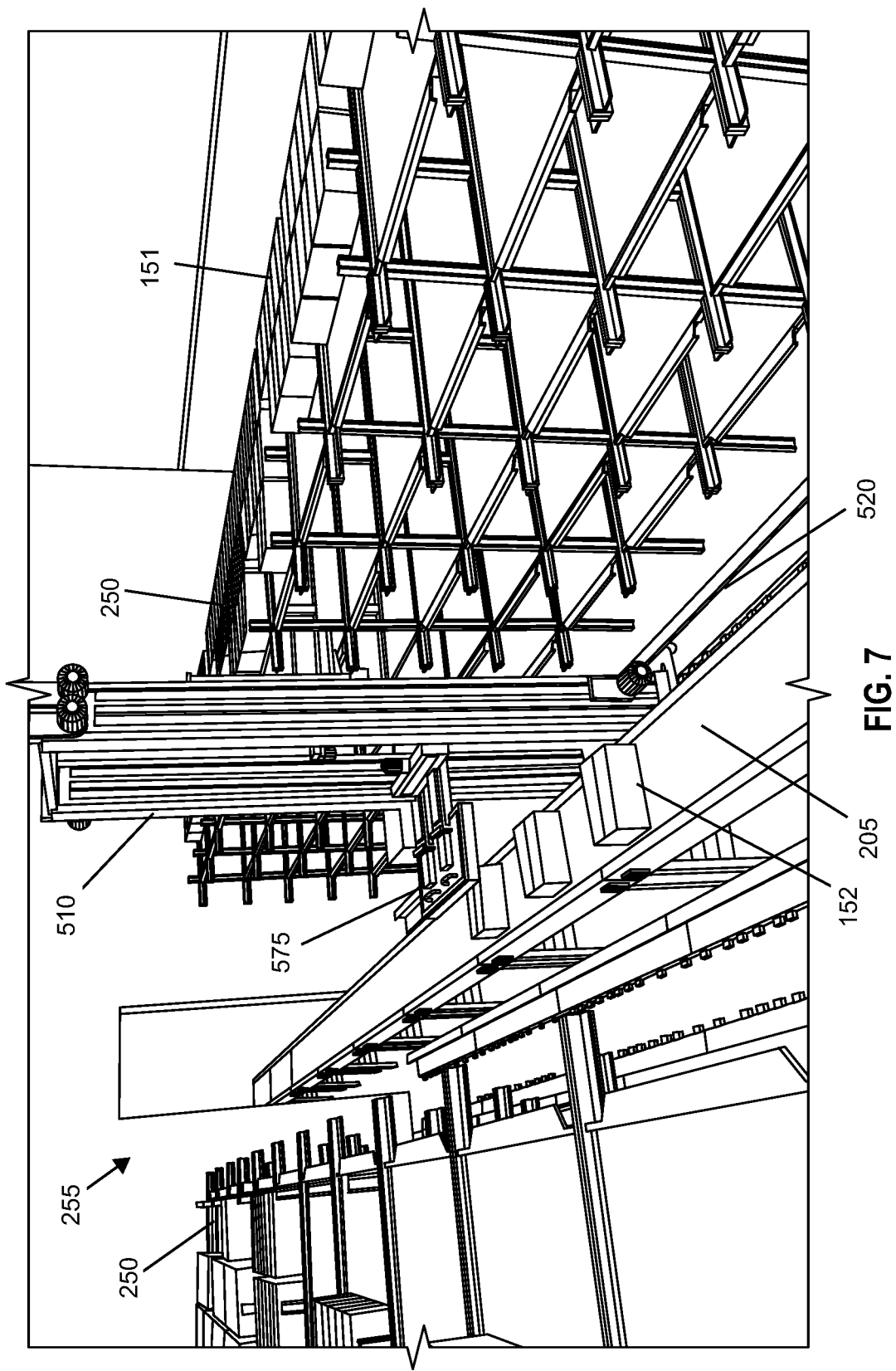
FIG. 7 is an illustration of another exemplary item retrieval device included in an order picking storage according to certain embodiments.
Figure 8:
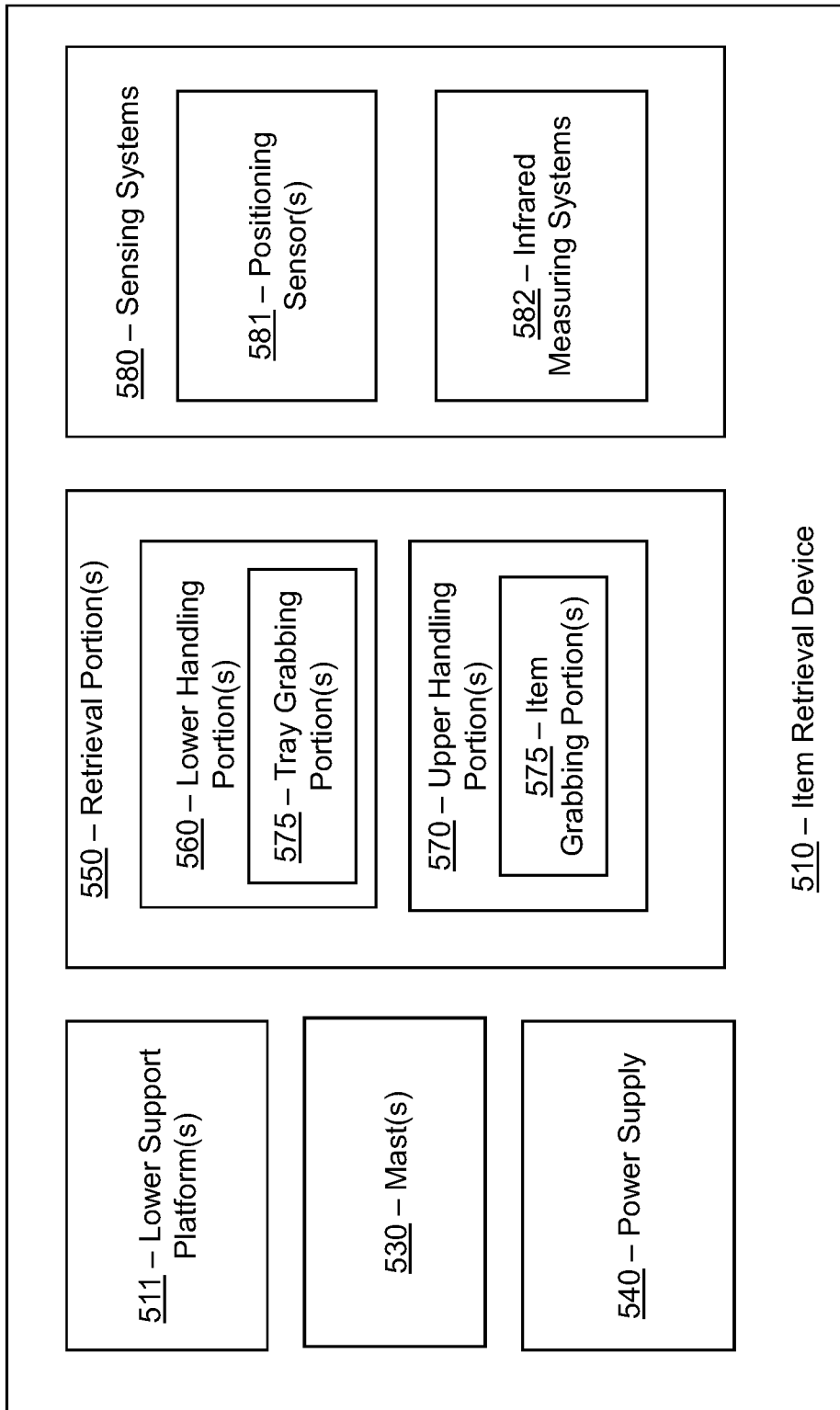
FIG. 8 is a block diagram illustrating exemplary features of an item retrieval device according to certain embodiments.

FIG. 6 discloses an example of an item retrieval device 510 according to certain embodiments. FIG. 7 discloses another example of an item retrieval device 510 situated in an item picking aisle 255 of an order picking storage area 142 according to certain embodiments. FIG. 8 is a block diagram illustrating exemplary features of item retrieval devices 510 according to certain embodiments. Other types of item retrieval devices can be utilized, and the features of any item retrieval devices 510 described herein can be combined in any manner. Moreover, the order picking storage area 142 and/or storage section 130 can include any number of item retrieval devices 510.

With reference to FIG. 6, the item retrieval device 510 is connected to one or more guide rails 520 that extend the length of an aisle 255. When the item retrieval device 510 is retrieving one or more items 152, the one or more guide rails 520 enable the item retrieval device 510 to linearly or laterally traverse the aisle 255 to a location where the one or more items 152 are located.

The configuration of the guide rails 520 can vary. Generally speaking, the guide rail may include any type of track or rail that assists with directing or guiding the movement of the item retrieval device 510. In certain embodiments, the guide rails 520 include a dual track configuration that includes a pair of tracks situated parallel to one another. The item retrieval device 510 includes wheels that enable the item retrieval device 510 to drive along the tracks. In certain embodiments, the guide rails 520 utilize a rack and pinion configuration in which a linear gear is placed in the center of each of the tracks and each liner gear engages a circular gear that is integrated into a wheel of the item retrieval device 510.

In certain embodiments, the item retrieval device 510 may include a lower support platform 511 that supports and/or is connected to one or more masts 530 extending vertically from the platform 511. In certain embodiments, the item retrieval device 510 may include a double mast configuration in which a pair of masts 530 are connected to the lower support platform 511.

A retrieval portion 550 is able to move vertically (e.g., up and down) along the one or more masts 530. The retrieval portion 550 can be configured to retrieve one or more items 152 from a layer 151 stored on a tray in a storage rack 250. When retrieving one or more items 152 from a stored layer 151, the vertical movability of the retrieval portion 550 enables the retrieval portion 550 to access a particular row or storage location where those items 152 are stored.

The configuration of the retrieval portion 550 can vary. In certain embodiments (e.g., such as illustrated in FIG. 6), the retrieval portion 550 includes a lower handling portion 560 and an upper handling portion 570. The lower handling portion 560 is configured to retrieve a tray 325 from a location of the storage rack 250 when the item retrieval device 510 is retrieving one or more items 152 from a stored layer 151. The manner in which the lower handling portion 560 retrieves trays 325 from storage racks 250 may vary.

In certain embodiments, a tray grabbing mechanism 565 included on the lower handling portion 560 can include extendible arms that are configured to extend outwardly (e.g., as indicated by directional arrow A in FIG. 6) toward a location on a storage rack 250 to grab a tray 325. After grabbing or gripping the tray 325, the extendible arms of the tray grabbing mechanism 565 can then retract inwardly (e.g., as indicated by directional arrow B in FIG. 6) to pull the tray 325 toward and/or onto the lower handling portion 560 of the item retrieval device 510.

The upper handling portion 570 can be configured to grab or retrieve one or more items 152 from the layer 151 included on the tray 325 after the tray 325 is pulled towards the lower handling portion 560 by the tray grabbing mechanism 565. For example, in some embodiments, one or more item grabbing portions 575 may be connected to a bottom surface of the upper handling portion 570. In the example illustrated in FIG. 6, two grabbing portions 575 are connected to the upper handling portion 570. However, any number of item grabbing portions 575 may be incorporated into the item retrieval device 510.

In certain embodiments, each of the item grabbing portions 575 can be individually controllable to grab an individual item 152 from the layer on the tray 325. In certain embodiments, each of the item grabbing portions 575 can utilize the same or similar gripping technologies (e.g., suction, vacuum, and/or clamping technologies) as the grabbing portions 415 included on the layer handling devices 410 to grip individual items 152 from a layer 151 in the tray 325. In certain embodiments, each of the item grabbing portions 575 can include a vacuum plate that is formed of a flexible or deformable material (e.g., such as EPDM, foam, and/or rubber), and each can include or be connected to one or more suction pumps. In this exemplary configuration, vacuum functions can be used to grab and retrieve the items 152 from the tray 325.

The tray grabbing mechanism 565 included on the lower handling portion 560 can be configured to pull the tray 325 far enough beneath the upper handling portion 570 such that the item grabbing portions 575 can access the items 152 included on the tray 325. In some embodiments, each of the item grabbing portions 575 are connected to a rail 571 that is situated perpendicularly with respect to the upper handling portion 570, and the item grabbing portions 575 are configured to move along the rail 571 in a linear fashion. Additionally, in some embodiments, each of the rails 571 can be configured to move inwardly (e.g., as indicated by directional arrow C) and outwardly (e.g., as indicated by directional arrow D).

The movability of the item grabbing portions 575 and/or the rails 571 enables the item retrieval devices 510 to precisely place the item grabbing portions 575 above the items 152 being retrieved from the tray 325. When the item grabbing portions 575 are placed over the items 152 designated for retrieval, the grabbing portions 575 can extend downward to grip the items, and the retract upward to remove the items 325 from the tray 325. The items 152 retrieved from the tray 325 can then be placed on an automated conveyor 205 that routes the items 152 to a location where the items 152 can be used to assembled a pallet 150 (e.g., a mixed pallet).

In certain embodiments, the item retrieval device 510 may include one or multiple sensing systems 580 to enable the item retrieval device 510 to precisely navigate to desired locations, grab items 152 from trays 325, place the items 152 on automated conveyors 205, and/or other related functions. The configuration of the sensing systems can vary. For example, the sensing systems can utilize feedback from any of the following components to perform these functions: infrared (IR) sensors, positioning sensors, proximity sensors, photocells, touch sensors, magnetic contact sensors, pressure sensors, contact sensors, light sensors, temperature sensors, acoustic sensors, sound sensors, video sensors, imaging sensors, image/video analysis software, and/or other sensing devices.

In certain embodiments, the sensing system 580 of the item retrieval device 510 includes one or more positioning sensors 581. The output of the one or more positioning sensors 581 can be utilized to drive or position the item retrieval device 510 to appropriate locations along the guide rails 520. In some cases, the positioning sensors may be used by the item retrieval device 510 to determine its location on the guide rail 520 with respect to a fixed reference point. Enabling the item retrieval device 510 to understand its position with respect to the fixed reference point can permit the item retrieval device 510 to precisely navigate to designated rack locations for retrieving items 152. In certain embodiments, the sensing system 580 of the item retrieval device 510 also utilizes one or more photocells (photoelectric cells) to assist the item retrieval device 510 with detecting its position.

In certain embodiments, the sensing system 580 of the item retrieval device 510 utilizes one or more infrared measuring systems 582 (e.g., comprising one or more infrared sensors) to assist the item retrieval device 510 with grabbing or interacting with objects (e.g., such as the trays 325, items 152, storage racks 250, and/or automated conveyors 205). For example, in some cases, the output of the one or more infrared measuring systems 582 can be provided to a control system that determines the proximity of the item retrieval device 510 to the objects. In some cases, a feedback loop can be then be used to adjust the movement of the item retrieval device 510 accordingly based on the outputs of the infrared measuring systems.

Additionally, one more power supplies 540 may be utilized to power the item retrieval device 510 and/or guide rails 520. In some embodiments, a first power supply 540 may include a rail power supply that is configured to supply power to gear motors that drive the guide rails 520 (e.g., linear gears included on the guide rails 520) and/or wheels (e.g., circular gears included on the wheels) of the item retrieval device 510. A second power supply 540 can be connected to the one or more masts 530 of the item retrieval device 510 to power the other portions of the item retrieval device 510 (e.g., the motors, gears, pumps, sensing systems, and/or other components included on the one or more masts 530, the lower handling portion 560, and the upper handling portion 570). In some embodiments, a single power supply may be included on the item retrieval device 510 that powers all of the components.

To further illustrate an example of the item retrieval device's 510 functionality, consider a scenario in which an order is received at the warehouse facility 100 that involves assembled of a mixed pallet 150B. In response to receiving the order, a WCS 270 or warehouse control system may send a signal, request, and/or instruction to the item retrieval device 510 (or control system associated with the item retrieval device 510) to retrieve two items 152 of a particular item type for inclusion in the mixed pallet 150B.

The WCS 270 or warehouse control system can execute inventory management software that knows the precise location of each pallet 150 included in the storage racks 250 in the storage section 130, as well as the precise location of each layer 151 included in the storage racks 250 in the order picking section 140. The inventory management software also can track the precise location of each item 152 included in each of the stored layers 151, and the remaining amount of items 152 in each of the layers 151. Using this tracking information, the WCS 270 or warehouse control system can select a layer 151 stored in the order picking storage area 142 for retrieving the two items 152. This information can be transmitted to the item retrieval device 510 and can identify the layer 151 and/or storage location from which the two items 152 are to be retrieved.

In response, the item retrieval device 510 may navigate along one or more guide rails 520 to an appropriate position in front of the designated storage rack structure 250. Using the received location information, the item retrieval device 510 can vertically adjust the retrieval portion 550 to an appropriate height corresponding to the designated row or storage location. The lower handling portion 560 can pull the tray 325 partially out from the storage rack 250, and the item grabbing portions 575 may use to the received location information to grab the two items 152 from the layer 151. The item grabbing portions 575 can then be moved and situated above an automated conveyor 205 located adjacent to the item retrieval device 510, and the two items 152 retrieved from the storage rack structures 250 may be placed on the automated conveyor 205.

The automated conveyor may then transport the items 152 to a workstation where the items 152 are added to a mixed pallet 150B. The mixed pallet may then be routed via one or more automated conveyors 205 to an outbound processing section 120 of the warehouse facility.

The item retrieval devices 510 illustrated in FIGS. 6 and 7 are provided as examples of automated devices that can be configured to retrieve items from rack structures. Other types of item retrieval devices 510 also may be utilized.

Returning back to FIG. 2B, the warehouse facility 100 may include a warehouse control system (WCS) 270 that can be configured to automate the functionality of warehouse facility 100 and perform other related functions as mentioned above. Amongst other things, the WCS 270 can be configured to control the functionality of the automated devices included in the warehouse facility 100 including, but not limited to, the automated conveyors 205, ASRSs 260, tray stacker devices 320, layer handling devices 410, elevators 430, item retrieval devices 510, AGVs, and/or other automated equipment included in the warehouse facility 100.

The WCS 270 may be implemented as a single application or program, or as multiple applications and programs. In some embodiments, the WCS 270 may represent a centralized controller that directly controls each of the automated devices. Additionally, or alternatively, the WCS 270 may comprise a plurality of separate controllers (e.g., separate controllers that are facilitate control of the automated conveyors 205, ASRSs 260, tray stacker devices 320, layer handling devices 410, elevators 430, item retrieval devices 510, AGVs, etc.), each of which controls one or more automated devices. With respect to the latter, the plurality of controllers may communicate with a centralized controller that controls overall operations of the warehouse facility 100.

The WCS 270 can be configured to automate control of any functions described herein involving: storing inbound pallets 150, layers 151 and/or items 152; fulfilling orders for delivery; assembling mixed pallets 150B; tracking storage of pallets 150, layers 151, and/or items 152 (e.g., in storage section 130 and order picking storage area 142); routing pallets 150, layers 151, and/or items 152 on automated conveyors 205 throughout the warehouse facility 100; controlling elevators 430; controlling the tray shift systems 440; controlling tray stacker devices 330; and/or other related functions. The WCS 270 may be configured to perform other related functions as well.

In certain embodiments, the WCS 270 may include one or more warehouse management system (WMS) applications that are configured to optimize operations in the warehouse facility 100. In some cases, the one or more WMS applications can be configured, inter alia, to track inventory in the warehouse facility 100 (e.g., in the storage section 130 and order picking storage area 142), select optimal storage locations for pallets 150 and layers 151 (e.g., locations in storage racks 250 included in the storage section 130 and order picking storage area 142), assign individuals and automated equipment to perform functions (e.g., stocking and storing functions), document activities performed in the warehouse facility, and provide real-time monitoring of various metrics and statuses across the warehouse facility 100.

The WCS 270 may be stored on and implemented using one or more computing devices. Exemplary computing devices can include desktop computer devices, laptops servers, mobile devices, etc. Each of the computing devices and warehouse facility components (e.g., conveyors 205, ASRSs 260, tray stacker devices 320, layer handling devices 410, elevators 430, item retrieval devices 510, AGVs, etc.) can further include one or more storage devices and one or more processors. The one or more storage devices may communicate with the one or more processors, and the one or more processors can execute any instructions stored on the one or more storage devices. The one or more storage devices may include: i) non-volatile memory, such as, for example, read only memory (ROM) or programmable read only memory (PROM); and/or (ii) volatile memory, such as, for example, random access memory (RAM), dynamic RAM (DRAM), static RAM (SRAM), etc. In certain embodiments, the one or more storage devices 263 can comprise (i) non-transitory memory and/or (ii) transitory memory. The one or more processors can include one or more central processing units (CPUs), graphics processor units, controllers, microprocessors, digital signal processors, and/or computational circuits. The one or more storage devices can store instructions for implementing any of the functions described herein (e.g., associated with controlling automated devices, tracking inventory, initiating storage of inventory, initiating fulfillment of orders, monitoring warehouse activities, etc.).

Each of the warehouse facility devices (e.g., automated conveyors 205, WCS 270 computing devices, ASRSs 260, tray stacker devices 320, layer handling devices 410, elevators 430, item retrieval devices 510, AGVs, etc.) also may include one or more communication devices (e.g., transceivers, wired communication interfaces, etc.) that enable the devices to communicate with each other. All of the devices can be configured to communicate directly with each other and/or over the network 190 via wired or wireless communication links, or a combination of the two. The network may represent any type of communication network, e.g., such as one that comprises a local area network (e.g., a Wi-Fi network and/or Ethernet network), a personal area network (e.g., a Bluetooth network), a wide area network, an intranet, the Internet, a cellular network, a telecommunications network, and/or other types of networks.

Figure 9:
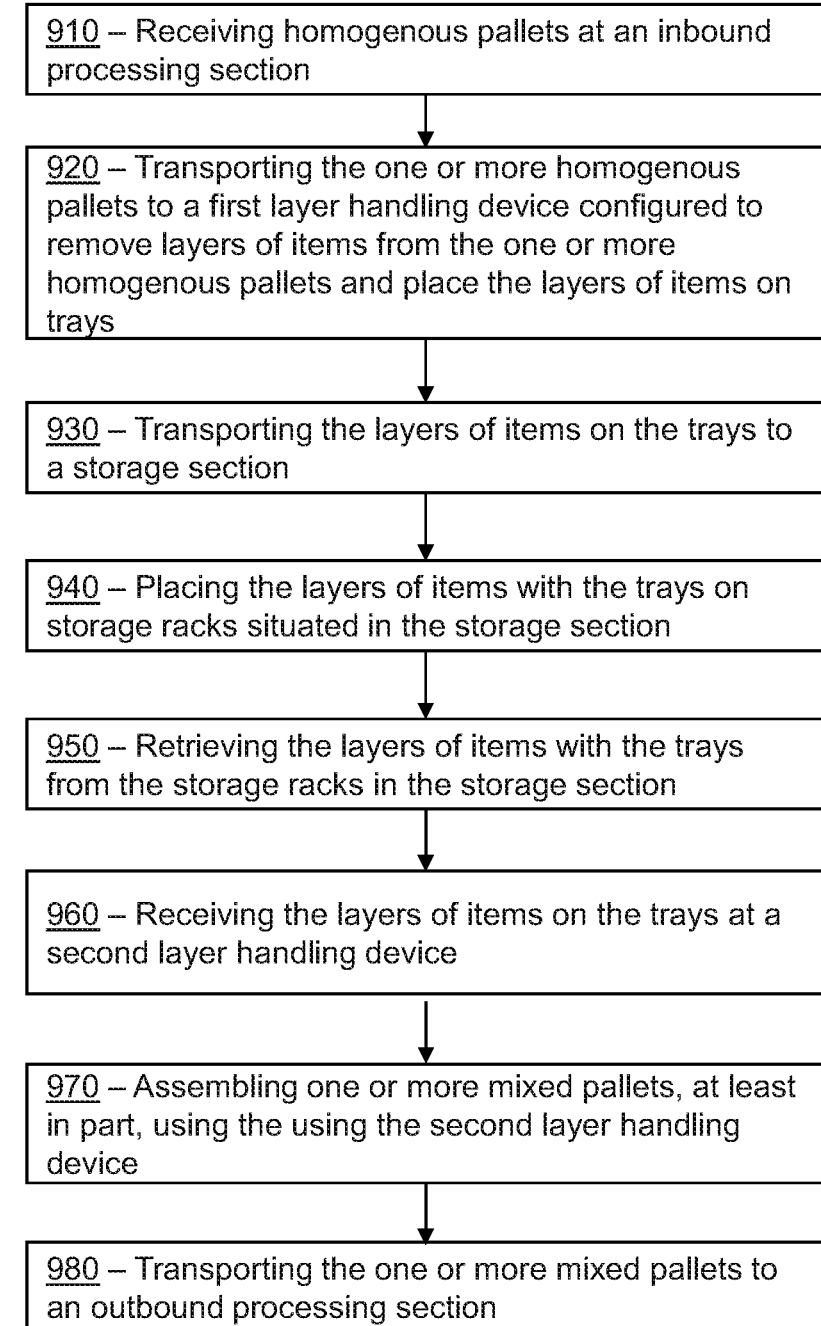
FIG. 9 is a flow diagram illustrating an exemplary method of assembling mixed pallets according to certain embodiments.

FIG. 9 is a flow diagram illustrating an exemplary method 900 for assembling mixed pallets 150B according to certain embodiments. Method 900 is merely exemplary and is not limited to the embodiments presented herein. Method 900 can be employed in many different embodiments or examples not specifically depicted or described herein. In some embodiments, the steps of method 900 can be performed in the order presented. In other embodiments, the steps of method 900 can be performed in any suitable order. In still other embodiments, one or more of the steps of method 900 can be combined or skipped. In certain embodiments, the method 900 (and/or one or more of the steps of method 900) can be carried out, or implemented, using one or more warehouse control systems, one or more automated conveyor devices, one or more ASRSs, one or more layer handling devices, and/or other components described herein. In these or other embodiments, one or more of the steps of method 900 can be implemented as one or more computer instructions configured to run at one or more processing devices and configured to be stored at one or more non-transitory computer storage devices. Such non-transitory memory storage devices can be part of one or more warehouse control systems, one or more automated conveyor devices, one or more ASRSs, one or more item retrieval devices, and/or other components described herein.

At step 910, one or more homogenous pallets 150A are received at an inbound processing section 110. For example, the one or more homogenous pallets 150A may be delivered to an automated warehouse facility 100 by one or more delivery vehicles 105, and transferred to the inbound processing section 110 using one or more one or more transport vehicles 310 and/or one or more AGVs.

At step 920, the one or more homogenous pallets 150A are transported to a first layer handling device 410 configured to remove layers 151 of items 152 from the one or more homogenous pallets 150A and place the layers 151 of items on trays 325. In certain embodiments, the first layer handling device 410 can be configured in a delayering operational mode 451, and the one or more homogenous pallets 150A may be transported to the first layer handling device 410 using one or more automated conveyor systems (e.g., each of which may include one or more automated conveyors 205)

At step 930, the layers 151 of items 152 on the trays 325 are transported to a storage section (e.g., order picking storage section 140 and/or storage section 130). The layers 151 of items 152 included on the trays 325 may be transported using one or more automated conveyor systems.

At step 940, the layers 151 of items 152 with the trays 325 are placed on storage racks 250 situated in the storage section. For example, one or more ASRSs 160 can be configured to retrieve the layers 151 of items 152 on the trays 325 from one or more automated conveyors 205 and place the layers 151 of items 152 with the trays 325 on the storage racks 250.

At step 950, the layers 151 of items 152 included on the trays 325 are retrieved from the storage racks 250 in the storage section. For example, one or more ASRSs 160 can be configured to retrieve the layers 151 of items 152 on the trays 325 from the storage racks 250.

At step 960, the layers 151 of items 152 on the trays 325 are received at a second layer handling device 410. In certain embodiments, the second layer handling device 410 can be configured in a palletizing operational mode 452, and the layers 151 of items 152 on the trays 325 can be transported to the second layer handling device 410 using one or more automated conveyor systems.

At step 970, one or more mixed pallets 150B are assembled, at least in part, using the using the second layer handling device 410. For example, the second layer handling device 410 can receive heterogeneous layers that comprise different types of items 152 and stack the heterogeneous layers on top of one another to assemble the one or more mixed pallets 150B.

At step 980, the one or more mixed pallets 150B are transported to an outbound processing section 120. For example, one or more automated conveyor systems can transport the one or more mixed pallets 150B to the outbound processing section 120. In some cases, the one or more mixed pallets 150B transported to the outbound processing section 120 can be loaded onto one or more transport vehicles 105 in connection with fulfilling an order.

Figure 10:
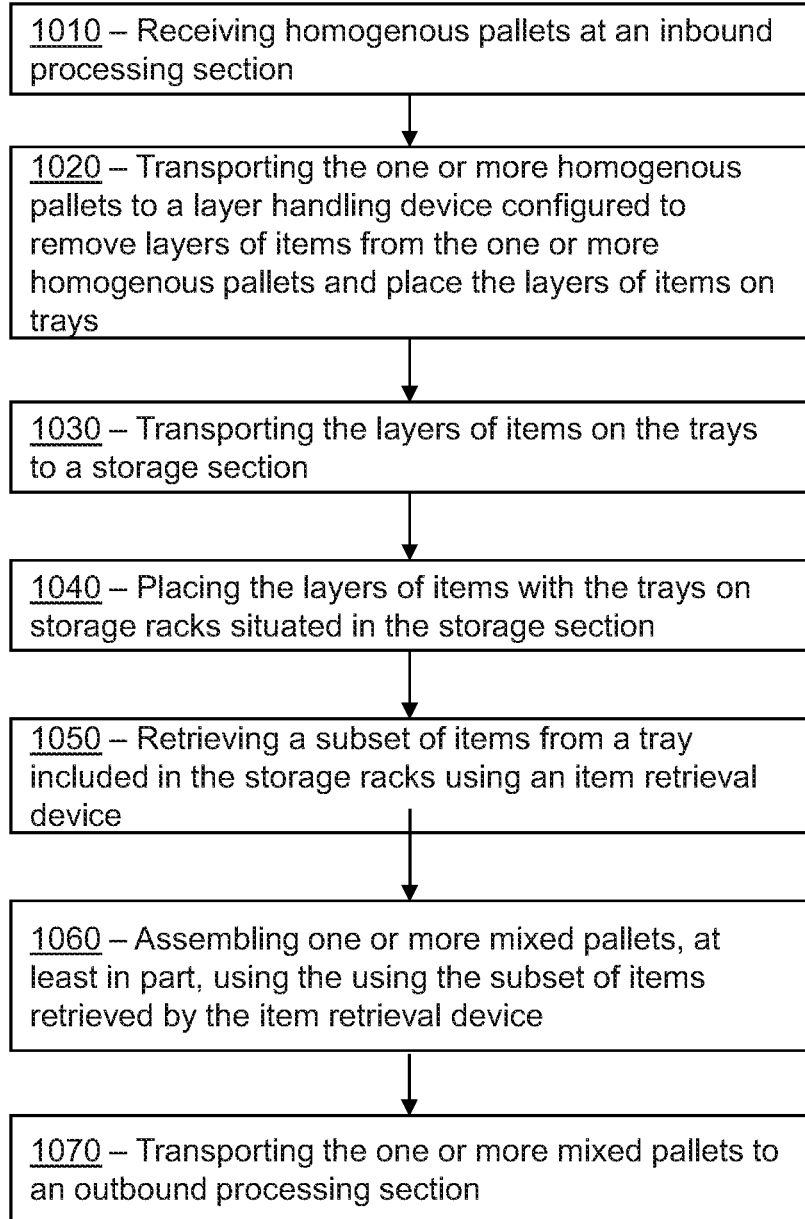
FIG. 10 is a flow diagram illustrating another exemplary method of assembling mixed pallets according to certain embodiments.

FIG. 10 illustrates a flow diagram illustrating an exemplary method 1000 for assembling mixed pallets according to certain embodiments. Method 1000 is merely exemplary and is not limited to the embodiments presented herein. Method 1000 can be employed in many different embodiments or examples not specifically depicted or described herein. In some embodiments, the steps of method 1000 can be performed in the order presented. In other embodiments, the steps of method 1000 can be performed in any suitable order. In still other embodiments, one or more of the steps of method 1000 can be combined or skipped. In certain embodiments, the method 1000 (and/or one or more of the steps of method 100) can be carried out, or implemented, using one or more warehouse control systems, one or more automated conveyor devices, one or more ASRSs, one or more item retrieval devices, and/or other components described herein. In these or other embodiments, one or more of the steps of method 1000 can be implemented as one or more computer instructions configured to run at one or more processing devices and configured to be stored at one or more non-transitory computer storage devices. Such non-transitory memory storage devices can be part of one or more warehouse control systems, one or more automated conveyor devices, one or more ASRSs, one or more item retrieval devices, and/or other components described herein.

At step 1010, one or more homogenous pallets 150A are received at an inbound processing section 110. This step may be performed in the same manner described above with respect to step 910.

At step 1020, the one or more homogenous pallets 150A are transported to a layer handling device 410 configured to remove layers 151 of items 152 from the one or more homogenous pallets 150A and place the layers 151 of items on trays 325. This step may be performed in the same manner described above with respect to step 920.

At step 1030, the layers 151 of items 152 on the trays 325 are transported to a storage section (e.g., order picking storage section 140 and/or storage section 130). This step may be performed in the same manner described above with respect to step 930.

At step 1040, the layers 151 of items 152 with the trays 325 are placed on storage racks 250 situated in the storage section. This step may be performed in the same manner described above with respect to step 940.

At step 1050, a subset of items 152 is retrieved from a tray 325 included in the storage racks 250 using an item retrieval device 510. For example, the item retrieval device 510 can be configured retrieve a single item or multiple items 152 from a tray 325 included in one of the storage racks 250, and place the single item 152 or multiple items 152 on an automated conveyor 205.

At step 1060, one or more mixed pallets 150B are assembled, at least in part, using the using the subset of items retrieved by the item retrieval device 510. For example, in some cases, an automated conveyor system can be configured to transport the subset of items retrieved by the item retrieval device 510 to an assembly station where the subset of items 152 are added to a mixed pallet 150B that is being assembled. The subset of items 152 may be manually incorporated into the mixed pallet 150B and/or incorporated into the mixed pallet 150B using an automated device.

At step 1070, the one or more mixed pallets 150B are transported to an outbound processing section 120. This step may be performed in the same manner described above with respect to step 980. In some cases, the one or more mixed pallets 150B transported to the outbound processing section 120 can be loaded onto one or more transport vehicles 105 in connection with fulfilling an order.

It should be recognized that the methods 900 and 1000 set forth in FIGS. 9 and 10 can be combined in various ways. Both methods 900 and 1000 may be utilized in an automated warehouse facility 100 to fulfill orders that involve mixed pallets 150B. Furthermore, in some cases, a warehouse control system 270 (or multiple warehouse control systems 270) can be configured to control components of a warehouse facility 100 (e.g., such as automated conveyors 205, ASRSs 260, layer handling devices 410, item retrieval devices 510, etc.) to implement some or all of the steps in methods 900 and 1000.

Additionally, it should be recognized that the embodiments described in this disclosure can be combined in various ways. Any aspect or feature that is described in connection with one embodiment can be incorporated into any other embodiment mentioned in this disclosure. Numerous variations can be made to the above-described systems and methods without departing from the scope of the invention.

While various novel features of the invention have been shown, described, and pointed out as applied to particular embodiments thereof, it should be understood that various omissions and substitutions and changes in the form and details of the systems and methods described and illustrated herein may be made by those skilled in the art without departing from the spirit of the invention. Amongst other things, the steps of any methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the particular system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation.

What is claimed is:

1. A layer handling device, comprising:
    a vacuum chamber comprising an enclosure and at least one downward facing aperture;
    a grabbing portion configured to retract inside the vacuum chamber enclosure via the aperture and configured to grab and manipulate a layer of items;
    a vacuum system that includes one or more vacuum plates situated near a bottom surface of the grabbing portion, the vacuum system being configured to provide a first vacuum extending between the layer of items and the vacuum plate in order to facilitate a suctioning function on the layer of items;
    a clamping system connected to the grabbing portion, the clamping system comprising a plurality of pusher plates that are configured to retract inside the vacuum chamber enclosure via the aperture and are configured to physically engage the layer of items around its perimeter; and
    an air pump system configured to provide a second vacuum when the grabbing portion and the pusher plates are retracted inside the vacuum chamber enclosure, the second vacuum extending between the pusher plates and the vacuum chamber enclosure and extending between an area above the one or more vacuum plates and the vacuum chamber enclosure.

2. The layer handling device of claim 1, wherein the vacuum system, the clamping system, and the air pump system jointly operate to manipulate the layer of items and retract the layer of items towards the vacuum chamber.

3. The layer handling device of claim 1, wherein the layer handling device further comprises a center adjustment mechanism configured to:
detect a center position of the layer of items; and
determine whether the layer of items is centered beneath the grabbing portion.

4. The layer handling device of claim 3, wherein:
in response to detecting that the layer of items is not centered beneath the grabbing portion, the center adjustment mechanism adjusts a position of the grabbing portion such that the grabbing portion is aligned with the center position of the layer of items.

5. The layer handling device of claim 3, wherein the center position of the layer of items is used to determine a placement of a tray beneath the layer of items.

6. The layer handling device of claim 1, wherein:
the layer handling device is configured in a delayering operational mode; and
in the delayering operational mode, the layer handling device is configured to receive a pallet comprising a plurality of layers and iteratively remove a top layer of items from the pallet.

7. The layer handling device of claim 6, wherein:
an elevator is situated beneath the layer handling device;
the elevator lifts the pallet to a height that enables the layer handling device to grab and remove the top layer from the pallet; and
the vacuum system, the clamping system, and the air pump system jointly operate to remove the top layer from the pallet.

8. The layer handling device of claim 1, wherein:
the layer handling device is configured in a palletizing operational mode;
in the palletizing operational mode, the layer handling device is configured to receive the layer of items on tray from an automated conveyor and remove the layer of items from the tray; and
the vacuum system, the clamping system, and the air pump system jointly operate to remove the layer of items from the tray.

9. The layer handling device of claim 1, wherein:
a slip sheet is included beneath the layer of items; and
the vacuum created by the air pump system assists both with grabbing the layer items and grabbing the slip sheet located beneath the layer.

10. The layer handling device of claim 1 further comprising:
a tray shift system that includes a sliding platform configured to transition between a first position beneath the vacuum chamber and a second position adjacent to an automated conveyor.

11. A layer handling device configured in a delayering operational mode, comprising:
a vacuum chamber comprising an enclosure and at least one downward facing aperture;
a grabbing portion configured to retract inside the vacuum chamber enclosure via the aperture and configured to grab and remove a layer of items from a pallet;
a vacuum system that includes one or more vacuum plates situated near a bottom surface of the grabbing portion, the vacuum system being configured to provide a first vacuum extending between the layer of items and the vacuum plate in order to facilitate a suctioning function on the layer of items;
a clamping system connected to the grabbing portion, the clamping system comprising a plurality of pusher plates that are configured to retract inside the vacuum chamber enclosure via the aperture and are configured to physically engage the layer of items around its perimeter; and
an air pump system configured to provide a second vacuum when the grabbing portion and the pusher plates are retracted inside the vacuum chamber enclosure, the second vacuum extending between the pusher plates and the vacuum chamber enclosure and extending between an area above the one or more vacuum plates and the vacuum chamber enclosure.

12. The layer handling device of claim 11, wherein the vacuum system, the clamping system, and the air pump system jointly operate to remove the layer of items from the pallet and retract the layer of items towards the vacuum chamber.

13. The layer handling device of claim 11, wherein the layer handling device further comprises a center adjustment mechanism configured to:
detect a center position of the layer of items; and
determine whether the layer of items is centered beneath the grabbing portion.

14. The layer handling device of claim 13, wherein:
in response to detecting that the layer of items is not centered beneath the grabbing portion, the center adjustment mechanism adjusts a position of the grabbing portion such that the grabbing portion is aligned with the center position of the layer of items.

15. The layer handling device of claim 13, wherein the center position of the layer of items is used to determine a placement of a tray beneath the layer of items.

16. The layer handling device of claim 11, wherein:
in the delayering operational mode, the layer handling device is configured to receive the pallet comprising a plurality of layers and iteratively remove a top layer of items from the pallet.

17. The layer handling device of claim 16, wherein:
an elevator is situated beneath the layer handling device;
the elevator lifts the pallet to a height that enables the layer handling device to grab and remove the top layer from the pallet; and
the vacuum system, the clamping system, and the air pump system jointly operate to remove the top layer from the pallet.

18. A layer handling device configured in a palletizing operational mode, comprising:
a vacuum chamber comprising an enclosure and at least one downward facing aperture;
a grabbing portion configured to retract inside the vacuum chamber enclosure via the aperture and configured to grab and remove a layer of items from a tray;
a vacuum system that includes one or more vacuum plates situated near a bottom surface of the grabbing portion, the vacuum system being configured to provide a first vacuum extending between the layer of items and the vacuum plate in order to facilitate a suctioning function on the layer of items;
a clamping system connected to the grabbing portion, the clamping system comprising a plurality of pusher plates that are configured to retract inside the vacuum chamber enclosure via the aperture and are configured to physically engage the layer of items around its perimeter; and an air pump system configured to provide a second vacuum when the grabbing portion and the pusher plates are retracted inside the vacuum chamber enclosure, the second vacuum extending between the pusher plates and the vacuum chamber enclosure and extending between an area above the one or more vacuum plates and the vacuum chamber enclosure.

19. The layer handling device of claim 18, wherein the vacuum system, the clamping system, and the air pump system jointly operate to remove the layer of items from the tray and retract the layer of items towards the vacuum chamber.

20. The layer handling device of claim 18, wherein the layer handling device further comprises a center adjustment mechanism configured to:

detect a center position of the layer of items; and
determine whether the layer of items is centered beneath the grabbing portion.

21. The layer handling device of claim 20, wherein:

in response to detecting that the layer of items is not centered beneath the grabbing portion, the center adjustment mechanism adjusts a position of the grabbing portion such that the grabbing portion is aligned with the center position of the layer of items.

22. The layer handling device of claim 18, wherein:

in the palletizing operational mode, the layer handling device is configured to receive the layer of items on the tray from an automated conveyor and remove the layer of items from the tray; and the vacuum system, the clamping system, and the air pump system jointly operate to remove the layer of items from the tray.

* * * * *